(12) United States Patent
King

(10) Patent No.: US 7,811,480 B2
(45) Date of Patent: *Oct. 12, 2010

(54) PHOTOCHROMIC OPTICAL ARTICLE

(75) Inventor: Eric M. King, Pittsburgh, PA (US)

(73) Assignee: Transitions Optical, Inc., Pinnellas Park, FL (US)

( * ) Notice: Subject to any disclaimer, the term of this patent is extended or adjusted under 35 U.S.C. 154(b) by 1785 days.

This patent is subject to a terminal disclaimer.

(21) Appl. No.: 10/793,588

(22) Filed: Mar. 4, 2004

(65) Prior Publication Data

US 2005/0196696 A1  Sep. 8, 2005

(51) Int. Cl.
*G02B 5/23* (2006.01)
*F21V 9/00* (2006.01)

(52) U.S. Cl. ...................... 252/586; 252/582

(58) Field of Classification Search ............ 252/586, 252/582
See application file for complete search history.

(56) References Cited

U.S. PATENT DOCUMENTS

| | | | |
|---|---|---|---|
| 3,361,706 A | 1/1968 | Meriwether et al. ........... 260/39 |
| 3,971,872 A | 7/1976 | LeBoeuf ..................... 428/412 |
| 4,166,043 A | 8/1979 | Uhlmann et al. ............. 252/300 |
| 4,367,170 A | 1/1983 | Uhlmann et al. ............. 252/286 |
| 4,405,679 A | 9/1983 | Fujioka et al. ............... 428/216 |
| 4,526,996 A | 7/1985 | Kilgour et al. ............... 556/413 |
| 4,720,356 A | 1/1988 | Chu ........................... 252/586 |
| 4,731,264 A | 3/1988 | Lin et al. .................... 427/387 |
| 4,756,973 A | 7/1988 | Sakagami et al. ........... 428/412 |
| 4,873,029 A | 10/1989 | Blum ........................ 264/1.3 |
| 4,904,525 A | 2/1990 | Taniguchi et al. ........... 428/328 |
| 4,931,220 A | 6/1990 | Haynes et al. .............. 252/586 |
| 5,051,309 A | 9/1991 | Kawaki et al. .............. 428/332 |
| 5,104,692 A | 4/1992 | Belmares ................... 427/164 |
| 5,130,353 A | 7/1992 | Fischer et al. ................ 524/43 |
| 5,134,191 A | 7/1992 | Takarada et al. ........... 524/783 |
| 5,185,390 A | 2/1993 | Fischer et al. ................ 524/43 |
| 5,231,156 A | 7/1993 | Lin ........................... 526/279 |
| 5,296,321 A | 3/1994 | Kawanishi et al. |
| 5,391,327 A | 2/1995 | Ligas et al. ................. 252/586 |
| 5,446,073 A | 8/1995 | Jonsson et al. ............. 522/104 |
| 5,462,866 A | 10/1995 | Wang ........................ 435/174 |
| 5,473,068 A | 12/1995 | Krongauz et al. |
| 5,580,819 A | 12/1996 | Li et al. ..................... 427/167 |
| 5,621,017 A | 4/1997 | Kobayakawa et al. ........ 522/16 |
| 5,639,802 A | 6/1997 | Neckers et al. ............... 522/25 |
| 5,645,767 A | 7/1997 | Van Gemert ................ 252/586 |
| 5,658,501 A | 8/1997 | Kumar et al. ............... 252/586 |
| 5,674,941 A | 10/1997 | Cho et al. |
| 5,728,758 A | 3/1998 | Smith |
| 5,728,769 A | 3/1998 | Natesh et al. ............... 524/591 |
| 5,757,459 A | 5/1998 | Bhalakia et al. ............ 351/168 |
| 5,770,115 A | 6/1998 | Misura ...................... 252/586 |
| 5,776,376 A | 7/1998 | Nagoh et al. ............... 252/586 |
| 5,808,063 A | 9/1998 | Kumar |
| 5,827,614 A | 10/1998 | Bhalakia et al. .......... 428/411.1 |
| 5,856,860 A | 1/1999 | Bhalakia et al. ............. 351/168 |
| 5,905,148 A | 5/1999 | Krongauz et al. |
| 5,910,375 A | 6/1999 | Parker et al. ................ 428/520 |
| 5,916,669 A | 6/1999 | Parker et al. ................ 428/216 |
| 5,962,617 A | 10/1999 | Slagel ........................ 528/61 |
| 6,025,026 A | 2/2000 | Smith et al. ................ 427/316 |
| 6,034,150 A | 3/2000 | Hoyle et al. .................. 522/63 |
| 6,060,001 A | 5/2000 | Welch et al. ................ 252/586 |
| 6,065,836 A | 5/2000 | Krishnan et al. ............ 351/163 |
| 6,068,797 A | 5/2000 | Hunt |
| 6,107,395 A | 8/2000 | Rosthauser et al. ......... 524/719 |
| 6,150,430 A | 11/2000 | Walters et al. ................ 522/79 |
| 6,175,450 B1 | 1/2001 | Andreani et al. ............ 359/586 |
| 6,187,444 B1 | 2/2001 | Bowles et al. ............ 428/423.1 |
| 6,190,777 B1 | 2/2001 | Asano et al. ................ 428/447 |
| 6,268,055 B1 | 7/2001 | Walters et al. .............. 428/413 |
| 6,306,923 B1 | 10/2001 | Thepot et al. ............... 522/107 |
| 6,328,446 B1 | 12/2001 | Bhalakia et al. ............. 351/163 |

(Continued)

FOREIGN PATENT DOCUMENTS

EP  0 443 803 A2  2/1991

(Continued)

OTHER PUBLICATIONS

"Novel Photoinitiator Free U V Curable Resins Based on Maleimides," Ericsson et al, RadTech 2002 Technical Conference Proceedings, pp. 435-449.

(Continued)

*Primary Examiner*—T. J. Kugel
(74) *Attorney, Agent, or Firm*—Deborah M Altman

(57) ABSTRACT

Describes a photochromic article, e.g., an ophthalmic photochromic plastic article, such as a lens, in which the article includes (1) a rigid substrate, e.g., polymeric substrate, such as a thermoset or thermoplastic substrate, (2) a photochromic polymeric coating appended to at least one surface of the substrate, the photochromic polymeric coating containing a photochromic amount of at least one photochromic material, e.g., spirooxazine, naphthopyran and/or fulgide, and (3) a film comprising a maleimide derivative coherently appended to the photochromic coating. Describes also the aforedescribed photochromic article having an abrasion-resistant coating affixed to the maleimide derivative-containing film, e.g., an abrasion-resistant coating comprising an organo silane; and describes further a photochromic article having an antireflective coating affixed to the abrasion-resistant coating.

9 Claims, No Drawings

U.S. PATENT DOCUMENTS

| | | | |
|---|---|---|---|
| 6,367,930 B1 | 4/2002 | Santelices et al. | 351/177 |
| 6,369,124 B1 | 4/2002 | Hoyle et al. | 522/63 |
| 6,410,611 B1 | 6/2002 | Sakurai et al. | 522/103 |
| 6,432,544 B1 | 8/2002 | Stewart et al. | 428/424.2 |
| 6,448,425 B1 | 9/2002 | Gedon et al. | 556/413 |
| 6,455,163 B1 | 9/2002 | Okamoto et al. | 428/412 |
| 6,503,631 B1 * | 1/2003 | Faverolle et al. | 428/447 |
| 6,506,322 B1 | 1/2003 | Breyne et al. | |
| 6,506,488 B1 | 1/2003 | Stewart et al. | 428/332 |
| 6,531,076 B2 | 3/2003 | Crano et al. | 252/586 |
| 6,547,390 B1 | 4/2003 | Bernheim et al. | 351/163 |
| 6,602,603 B2 | 8/2003 | Welch et al. | 428/412 |
| 6,639,039 B1 | 10/2003 | Fries et al. | |
| 7,189,456 B2 * | 3/2007 | King | 428/412 |
| 2002/0006505 A1 | 1/2002 | Nishizawa et al. | |
| 2002/0076549 A1 | 6/2002 | Welch et al. | |
| 2002/0114054 A1 | 8/2002 | Rietjens et al. | |
| 2002/0136899 A1 * | 9/2002 | deRojas et al. | 428/412 |
| 2003/0008149 A1 | 1/2003 | Moravec et al. | |
| 2003/0073755 A1 | 4/2003 | Garnett et al. | |
| 2003/0165686 A1 | 9/2003 | Blackburn et al. | 428/412 |

FOREIGN PATENT DOCUMENTS

| | | |
|---|---|---|
| EP | 878482 A1 | 11/1998 |
| EP | 1 388 749 A1 | 2/2004 |
| EP | 1433814 A1 | 6/2004 |
| JP | 1022327 | 1/1986 |
| JP | 7159923 | 6/1995 |
| JP | 11072808 | 3/1999 |
| JP | 2000026725 | 1/2000 |
| JP | 2000/143729 A2 | 5/2000 |
| JP | 2003-2935 | 1/2003 |
| WO | WO 99/03930 | 1/1999 |
| WO | WO 00/36049 | 6/2000 |
| WO | WO 01/68602 A | 9/2001 |
| WO | WO 01/90268 | 11/2001 |
| WO | WO 2004/044626 A1 | 5/2004 |

OTHER PUBLICATIONS

B. Fischer, C. Thieme, T.M. Fischer, F. Kremer, T. Oge and R. Zentel: "The Packing of Azobenzene Dye Moieties and Mesogens in the Opto-Dielectric Effect"; Liquid Crystals, 1997, vol. 22, No. 1; pp. 65-74.

S.C. Clark, S.Johnson and C.E. Hoyle: "Photoinitiated Polymerization of Acrylates Using Functional Maleimides"; Polymer Preprints, American Chemical Society; vol. 2, No. 37, 1996; pp. 348-349.

* cited by examiner

PHOTOCHROMIC OPTICAL ARTICLE

DESCRIPTION OF THE INVENTION

The present invention relates to photochromic articles comprising a rigid substrate to which is applied a photochromic polymeric coating on which is superposed a transparent polymer comprising a maleimide derivative. In particular, the present invention relates to rigid transparent substrates, e.g., glass and organic plastic substrates used for optical applications. More particularly, the present invention relates to photochromic articles used for ophthalmic applications, e.g., lenses. Still more particularly, the present invention relates to photochromic articles comprising a transparent polymeric substrate having a transparent photochromic organic polymeric coating appended to at least a portion of at least one surface of the substrate, and a transparent layer comprising a radiation cured composition comprising a maleimide derivative superposed on said photochromic coating.

In a particular embodiment, the present invention relates to photochromic articles, such as an ophthalmic plastic lens, on at least one portion of at least one surface of which has been appended sequentially, a first layer of a transparent, desirably optically clear, photochromic polymeric coating and a second transparent layer comprising a radiation cured composition comprising a maleimide oligomer. In a further embodiment of the present invention, there are contemplated photochromic articles having a third layer comprising at least one abrasion-resistant coating that is superposed on the second layer. In a still further embodiment, a fourth layer, e.g., an antireflective coating, is superposed on the abrasion-resistant coating. Additional layers may be applied to or below the fourth layer to provide additional functional properties to the photochromic article, e.g., antistatic and/or anti-wetting coatings.

Clear ophthalmic articles that provide good imaging qualities, while reducing the transmission of incident light into the eye, are needed for a variety of applications, such as sunglasses, vision correcting ophthalmic lenses, plano lenses and fashion lenses, e.g., non-prescription and prescription lenses, sport masks, face shields, goggles, visors, camera lenses, windows, automotive windshields, and aircraft and automotive transparencies, e.g., T-roofs, sidelights and backlights. Responsive to that need, photochromic plastic articles used for optical applications have been given considerable attention. In particular, photochromic ophthalmic plastic lenses have been of interest because of the weight advantage they offer, vis-à-vis, glass lenses.

In addition, embodiments of the present invention can be used in association with plastic films and sheets, optical devices, e.g., optical switches, display devices and memory storage devices, such as those described in U.S. Pat. No. 6,568,452, and security elements, such as optically-readable data media, e.g., those described in U.S. Patent Application 2002/0142248, security elements in the form of threads or strips, as described in U.S. Pat. No. 6,474,695, and security elements in the form of verification marks that can be placed on security documents and articles of manufacture.

Photochromism is a phenomenon involving a reversible change in color of an organic or inorganic material, e.g., a chromene or silver halide salt, or an article comprising such a material, upon exposure to ultraviolet radiation. Sources of radiation that contain ultraviolet rays include, for example, sunlight and the light of a mercury lamp. When the photochromic material is exposed to ultraviolet radiation, it exhibits a change in color, and when the ultraviolet radiation is discontinued, the photochromic material returns to its original color or colorless state. Ophthalmic articles that have photochromic material(s) applied to or incorporated within the article exhibit this reversible change in color and a consequent reversible change in light transmission.

The mechanism believed to be responsible for the reversible change in color, i.e., the change in the absorption spectrum in the electromagnetic spectrum of visible light (400-700 nm), that is characteristic of different types of organic photochromic compounds has been described. See, for example, John C. Crano, "Chromogenic Materials (Photochromic)", Kirk-Othmer Encyclopedia of Chemical Technology, fourth Edition, 1993, pp. 321-332. The mechanism responsible for the reversible change in color for organic photochromic compounds, such as indolino spiropyrans and indolino spirooxazines, is believed to involve an electrocyclic mechanism. When exposed to activating ultraviolet radiation, these organic photochromic compounds transform from a colorless closed ring form into a colored open ring form. In contrast, the electrocyclic mechanism responsible for the reversible change in color of photochromic fulgide compounds is believed to involve a transformation from a colorless open ring form into a colored closed ring form.

Photochromic plastic articles have been prepared by incorporating the photochromic material into the plastic substrate by surface imbibition techniques. In such method, photochromic dyes are incorporated into the subsurface region of a plastic article, such as a lens, by first applying one or more photochromic dyes/compounds to the surface of the plastic article, either as the neat photochromic dye/compound or dissolved in a polymeric or other organic solvent carrier, and then applying heat to the coated surface to cause the photochromic dye/compound(s) to diffuse into the subsurface region of the plastic article (a process commonly referred to as "imbibition"). The plastic substrates of such photochromic plastic articles are reported to have sufficient free volume within the polymer matrix to allow photochromic compounds, such as the aforementioned spirooxazines, spiropyrans and fulgides, to transform from the colorless form into the colored form, and then revert to their original colorless form. There are, however, certain polymer matrices that are reported not to have sufficient free volume to allow the aforedescribed electrocyclic mechanism to occur sufficiently to permit their use as a substrate for imbibed (or internally incorporated) photochromic materials for commercially acceptable photochromic applications. Such substrates include, for example, thermoset polymer matrices, such as those prepared from polyol (allyl carbonate) monomers, notably allyl diglycol carbonate monomers, e.g., diethylene glycol bis(allyl carbonate), and copolymers thereof, the commonly known thermoplastic bisphenol A-based polycarbonates, and highly cross-linked optical polymers.

To allow the use of thermoset polymers, thermoplastic polycarbonates, and highly cross-linked optical polymeric materials as plastic substrates for photochromic articles, it has been proposed to apply organic photochromic coatings to the surface of such plastic substrates. It has also been proposed to apply an abrasion-resistant coating onto the exposed surface of the photochromic coating to protect the surface of the photochromic coating from scratches and other similar cosmetic defects resulting from physical handling, cleaning and other exposure of the photochromic coating to the environment.

In certain circumstances involving ophthalmic plastic lenses having a photochromic polymeric coating and an overlay of an abrasion-resistant coating, it has been observed that when such lenses are severely scratched, cleaning of such a scratched lens with commercially available cleaning solutions containing alcohol, e.g., isopropyl alcohol, may cause imperfections in the photochromic coating. In addition, it is not uncommon to find that during manufacture of such plastic lenses an abrasion-resistant coating that is applied to the photochromic coating, or an antireflective coating that is applied to the abrasion-resistant coating, fails to pass product requirements, or in the case of ophthalmic lenses does not meet commercially acceptable "cosmetic standards" for ophthalmic lenses. Cosmetic defects in a coated lens can include spots, scratches, inclusions, cracks and crazing. When this occurs, it is economically desirable to remove the defective coating, e.g., by chemical treatment with an aqueous caustic solution, and thereafter to apply a new coating. In the process of chemically removing the unacceptable coating, the underlying coatings, e.g., the photochromic coating, can be damaged, thereby destroying the value of the article, e.g., the lens. As is readily evident to those skilled in the art, sequential application of the abrasion-resistant and the antireflective coatings to the photochromic coating of an ophthalmic lens is one of the last in a series of multiple manufacturing steps, each of which adds value and increases the cost of the lens being produced. To scrap the lens at this near final stage of the production process because an appended coating fails to meet product requirements increases production costs and increases the final cost of the lens product. Avoidance of such product losses is, therefore, economically desirable.

Further, some manufacturers of photochromic ophthalmic lenses desire to place their own proprietary abrasion-resistant and/or antireflective coatings on the photochromic coated lenses that have been prepared by another manufacturer. It is possible for the photochromic coating to become scratched or blemished as a consequence of packaging, shipment, unpacking, cleaning or other physical handling of the lens in preparation for the application of such abrasion-resistant and/or antireflective coatings. Consequently, it is desirable that a lens that is shipped to such manufacturers be resistant to scratches or other cosmetic imperfections that may be caused during packaging, unpacking, shipment, cleaning and/or handling of the photochromic coated lens, i.e., be scratch resistant.

To attenuate some of the foregoing difficulties, it has been proposed to apply a radiation-cured acrylate-based film between the photochromic coating and the abrasion resistant coating thereby to lessen certain manufacturing problems associated with removing defective abrasion resistant coatings and/or antireflective coatings from the photochromic coating, and to protect a photochromic coating having no abrasion-resistant coating during handling and shipment. The radiation-cured acrylate-based film is described as being (a) scratch resistant, (b) resistant to treatment with dilute aqueous inorganic caustic solutions, and (c) compatible with abrasion-resistant, organo silane-containing coatings. In applying the acrylate-based film to the photochromic coating, a polymerizable acrylic composition containing a photoinitiator is used.

Generally, photoinitiator compounds have an aromatic ring in their structure, which effectively absorbs ultraviolet light. Moreover, they are usually of low molecular weight to improve their solubility in the radiation curable composition, and consequently are relatively volatile when subjected to heat. The use of conventional photoinitiators typically results in the production of small molecule photo-byproducts and residual unconsumed photoinitiator. The presence of such the residual photoinitiator and photo-byproducts can result in yellowing of the cured composition and produce unpleasant odors when the curable and cured composition containing the photoinitiator is subjected to heat and light during and after curing. Further, it is known that the unreacted residual or photo-byproducts of the photoinitiators remaining in the cured composition after curing can migrate to the surface of the cured resin and/or be extracted or leached out from the resin if the resin is contacted with water. Such results typically are not desirable in many commercial applications.

It is therefore desirable to utilize a radiation-curable coating composition that does not require a photoinitiator for curing, or requires lower amounts of a photoinitiator than are generally used in radiation-curable coating compositions. It has now been discovered that coatings/films prepared from a composition comprising at least one maleimide derivative can be cured by radiation without use of a photoinitiator, or can be cured by radiation using only small amounts of photoinitiator; and that such a coating/film when placed between the photochromic polymeric coating and the abrasion-resistant coating, can substantially attenuate the manufacturing problems described above. The coating/film comprising the maleimide derivative adheres to the photochromic coating, is typically harder than the photochromic coating and is compatible with abrasion-resistant coatings comprising an organo silane material; namely, the applied abrasion-resistant coating does not craze after having been cured, i.e., exhibit fine cracks.

In accordance with a particular embodiment of the present invention, there is contemplated a photochromic article, e.g., a lens, comprising, in combination:
(a) a rigid transparent substrate;
(b) a photochromic organic polymeric coating appended to at least a portion of at least one surface of said substrate, said polymeric coating comprising at least one organic photochromic material; and
(c) a transparent film of a radiation cured composition comprising a maleimide derivative appended coherently to said photochromic polymeric coating.

In another embodiment of the present invention, there is contemplated the above-described photochromic article further comprising an abrasion-resistant coating, such as a hard coating comprising an organo silane, that is appended to the exposed surface of the radiation cured maleimide derivative-containing film. In a further embodiment of the present invention, there is contemplated a photochromic article that has an antireflective coating applied to the abrasion-resistant coating. Other coatings, such as antistatic and/or antiwetting coatings can also be applied to the antireflective coating.

In a still further embodiment of the present invention, there is contemplated an ophthalmic photochromic article comprising, in combination:
(a) a transparent organic plastic substrate, such as a thermoset substrate prepared from a polymerizable composition comprising an allyl diglycol carbonate, e.g., diethylene glycol bis(allyl carbonate), a substrate prepared from thermoplastic polycarbonate, a substrate prepared from a polyurea urethane, or a substrate prepared from compositions comprising the reaction product of polyfunctional isocyanate(s) and/or isothiocyanate(s) with polythiol(s) or polyepisulfide monomer(s);
(b) an optically clear photochromic organic polymeric coating, such as an acrylic-based, polyurethane-based, aminoplast resin-based, polyepoxy-based or polyurea urethane-based photochromic coating, appended to at least one surface of said plastic substrate, said photochromic polymeric coating comprising a photochromic amount of at least one organic photochromic material;
(c) an optically clear, radiation-cured layer, e.g., film, of a composition comprising a maleimide oligomer adhered coherently to said photochromic coating; and
(d) optionally, an abrasion resistant coating, such as a hard coating comprising an organo silane, adhered to said maleimide derivative-containing layer. In yet a further contemplated embodiment, an antireflective coating is adhered to said abrasion-resistant coating, assuming that the abrasion-resistant coating is present.

DETAILED DESCRIPTION OF THE INVENTION

In accordance with the present invention, there are provided photochromic articles comprising, in combination, a rigid substrate, e.g., a transparent substrate such as glass or an organic polymeric material; a photochromic polymeric coating affixed to at least a portion of at least one surface of the substrate; and a layer, e.g., coating/film, prepared from a composition comprising a maleimide derivative superposed on, e.g., adhered to, the photochromic coating. The layer comprising the maleimide derivative is typically (a) harder than the photochromic coating (the photochromic coating is typically softer than the film comprising the maleimide derivative), e.g., it is less likely to be penetrated, marred or scratched than the photochromic coating when subjected to rubbing or scraping, and desirably (b) compatible with abrasion-resistant, organo silane-containing coatings.

For purposes of this specification (other than in the operating examples), unless otherwise indicated, all numbers expressing quantities and ranges of ingredients, reaction conditions, etc., such as those expressing refractive indices and wavelengths, are to be understood as modified in all instances by the term "about". Accordingly, unless indicated to the contrary, the numerical parameters set forth in this specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent. As used herein, the term "cure" "cured" or similar terms, as used in connection with a cured or curable composition, e.g., a "cured composition" of some specific description is intended to mean that at least a portion of the polymerizable and/or crosslinkable components that form the curable composition are at least partially polymerized and/or crosslinked. In certain embodiments, the crosslink density of the crosslinkable components, e.g., the degree of crosslinking can range from 5% to 100% of complete crosslinking. In other embodiments, the crosslink density can range from 35% to 85%, e.g., 50% to 85%, of full crosslinking. The degree of crosslinking can range between any combination of the previously stated values, inclusive of the recited values.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The specific citation in this specification of patent applications, published or granted patents and published articles, such as the disclosures in identified patents that are referred to by column and line number, which describe relevant methods for preparing monomers, polymerizates, coatings, articles of manufacture, photochromic compounds, etc. are incorporated herein, in toto, by reference.

In accordance with an embodiment of the present invention, a layer, e.g., film, comprising a radiation-cured composition comprising a maleimide derivative, e.g., a maleimide oligomer, such as a bismaleimide oligomer, is superposed on, e.g., adhered coherently to, the photochromic polymeric coating. Maleimide derivatives such as maleimide oligomers are known in the art. These materials can be used as photoinitiators or as co-monomers with other radiation curable resins, such as acrylic resins. See, for example, U.S. Pat. Nos. 5,446,073; 6,034,150; 6,306,923 B1; 6,369,124 B1; 6,410,611 B1; and 2003/0073755 A1; EP Patent Publication 0 878,482 A1; and International Patent Publications WO 99/03930 and WO 01/68602.

Maleimide derivatives that can be used to prepare the photochromic optical articles of the present invention can be represented by the following general formula I:

    I wherein:
(a) M is the maleimido group, i.e.,

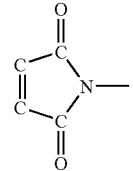

(b) R is a linear or branched $C_1$ to $C_{10}$ alkyl; and
(c1) FG is a functional group chosen from —$OR_3$, —OC(O)N($R_3$)$_2$, OC(O)C(=CHR$_3$)R$_3$, —OC(O)R$_3$, —C(O)R$_3$, —N(R$_3$)$_2$, —C(O)OR$_3$, —NCO, —C(O)N(R$_3$)$_2$, or —OC(O)OR$_3$, provided that when FG is —OR$_3$, R is $C_1$ to $C_4$ linear or branched alkyl; each $R_3$ being chosen from hydrogen, alkyl, aryl, cycloalkyl, arylalkyl or alkylaryl groups of less than 20 carbon atoms, e.g., from 1 to 10 carbon atoms; or
(c2) FG is a functional group, as defined in (c1) in combination with a spacer group linking said maleimido group with at least one other maleimido group to form a polymaleimido compound, such as a di-, tri-, tetra- or other polymaleimido compound.

In particular, the maleimide derivative can be depicted by the general representations:

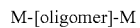    II, and

    IIA wherein M is as defined above in formula I, x is a number of from 2 to 4, and [oligomer] represents the structure linking the maleimido groups.

More particularly, the maleimide derivative can be represented by the following general formula III:

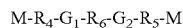    III wherein M is as defined in formula I, $R_4$ and $R_5$ represent linking groups, which may be the same or different, and are each independently chosen from bivalent alkylene, alicyclic, arylalkylene, or cycloalkyalkylene groups of less than 20 carbon atoms, $G_1$ and $G_2$ each represent an ester linkage represented by —C(O)O— or —OC(O)—, or the group —OC(O)N-(oxyisocyanato), and $R_6$ represents a bivalent linking group chosen from alkylene groups (linear or branched) of from 1 to 24 carbon atoms, an alkylene group of from 1 to 24 carbon atoms comprising a hydroxy functionality, a cycloalkylene (alicyclic) group of from 4 to 7 carbon atoms, a dicycloalkylene alkyl group of from 11 to 24 carbon atoms, an arylene group of from 6 to 10 carbon atoms, an arylalkylene group of from 6 to 24 carbon atoms, a diarylene alkyl group of from 13 to 24 carbon atoms, a polyether group, or a polyester group. The polyether and polyester groups can have average molecular weights of from 100 to 5,000.

Non-limiting examples of the groups depicted in formula III, as well as examples of maleimide derivatives and methods for preparing such derivatives, can be found at column 4, line 26 through column 12, line 24 of U.S. Pat. No. 6,410,611 B1. In particular, examples of $R_4$ and $R_5$ include straight and branched chain alkylene groups, such as $C_1$ to $C_{12}$ alkylene groups, e.g., the methylene, ethylene, trimethylene, tetramethylene, pentamethylene, hexamethylene, heptamethylene, octamethylene, nonamethylene, decamethylene, undecamethylene, dodecamethylene, 1-methylethylene, 1-methyl-trimethylene, 2-methyl-trimethylene, 1-methyl-tetramethylene, 2-methyl-tetramethylene, 1-methyl-pentamethylene, 2-methyl-pentamethylene, 3-methyl-pentamethylene, and neopentyl groups, and the like; cycloalkylene groups such as the cyclopentylene and cyclohexylene groups; arylalkylene groups having an aryl group at a main chain or a side chain, such as the benylene, 2,2-diphenyl-trimethylene, 1-phenyl-ethylene, 1-phenyl-tetraethylene, 2-phenyl-tetraethylene groups, and the like; cycloalkyl alkylene groups having an alicyclic groups at a main chain or a side chain, such as cyclohexyl-methylene, 1-cyclohexy-ethylene, 1-cyclohexyl-tetraethylene, 2-cylclohexyl-tetraethylen groups, and the like.

Non-limiting examples of the linking chain represented by $R_6$ include:
(a) a polyether polyol residue group having an average molecular weight of 100 to 5,000, and comprising a part in which at least one group chosen from a straight chain alkylene group having 1 to 24 carbon atoms, a branched alkylene group having from 2 to 24 carbon atoms, an alicyclic group having from 3 to 24 carbon atoms, or an aryl group having from 6 to 24 carbon atoms is connected with an ether linking chain or a repeating unit thereof;
(b) a polyester polyol residue group having an average molecular weight of 100 to 5,000 and comprising a part in which at least one group chosen from a straight chain alkylene group having from 2 to 24 carbon atoms, a branched alkylene group having from 2 to 24 carbon atoms, an alicyclic group having from 3 to 24 carbon atoms, or an aryl group having from 6 to 24 carbon atoms is connected with an ester linking chain or a repeating unit thereof;
(c) a polycarboxylate polyether polyol ester having a polycarboxylic acid residue group at a terminal position obtained by esterification of polyether polyol with a carboxylic acid having 2 to 6 carbon atoms, which have an average molecular weight of 100 to 5,000, and comprising a part in which at least one group chosen from a straight chain alkylene group having from 1 to 24 carbon atoms, a branched alkylene group having from 2 to 24 carbon atoms, an alicyclic group having from 3 to 24 carbon atoms, or an aryl group having from 6 to 24 carbon atoms is connected with an ester linking chain or a repeating unit thereof;
(d) a polycarboxylate polyester polyol ester having a polycarboxylic acid residue group at a terminal position obtained by esterification of polyester polyol with a carboxylic acid having from 2 to 6 carbon atoms, which have an average molecular weight of 100 to 5,000, e.g., 100 to 2000, and comprising a part in which at least one group chosen from a straight chain alkylene group having from 1 to 24 carbon atoms, a branched alkylene group having from 2 to 24 carbon atoms, an alicyclic group having from 3 to 24 carbon atoms, or an aryl group having from 6 to 24 carbon atoms is connected with an ether and an ester linking chain or a repeating unit thereof; and
(e) a linking chain obtained by ring opening a polyepoxide having an average molecular weight of from 100 to 5,000, and comprising a part in which at least one group chosen from a straight chain alkylene group having from 1 to 24 carbon atoms, a branched alkylene group having from 2 to 24 carbon atoms, an alicyclic group having from 3 to 24 carbon atoms, or an aryl group having from 6 to 24 carbon atoms is connected with an ether linking chain, or a repeating unit comprising the parts, and the like.

Examples of polyether polyol linking chains described above include, but are not limited to, polyalkylene glycols such as polyethylene glycol, polypropylene glycol, polybutylene glycol, polytetramethylene glycol, and the like; modified alkylene glycols in which ethylene glycol, propanediol, propylene glycol, tetramethylene glycol, pentamethylene glycol, hexanediol, neopentyl glycol, glycerin, trimethylolpropane, pentaerythritol, diglycerin, ditrimethylolpropane, dipentaerythritol, and the like are modified by ethylene oxides, propylene oxides, butylene oxides, and tetrahydrofuran. Further non-limiting examples include hydrocarbon polyols, such as a copolymer of ethylene oxide and propylene oxide, a copolymer of propylene glycol and tetrahydrofuran, a copolymer of ethylene glycol and tetrahydrofuran, polyisoprene glycol, hydrogenated polyisoprene glycol, polybutadiene glycol, hydrogenated polybutadiene glycol, and the like; polyhydric alcohol compounds such as polytetramethylene hexaglycerin ether (modified hexaglycerin by tetrahydrofuran) and the like.

Examples of polyester polyol linking chains include, but are not limited to, polyalkylene glycols, such as polyethylene glycol, polypropylene glycol, polybutylene glycol, polytetramethylene glycol, hexanediol, neopentyl glycol, glycerin, trimethylolpropane, pentaerythritol, diglycerin, ditrimethylolpropane, dipentaerythritol, and the like which are modified by ϵ-caprolactone, γ-butyrolactone, δ-valerolactone, and methyl valerolactone; aliphatic polyester polyols which are synthesized by esterification of aliphatic dicarboxylic acids such as adipic acid, dimeric acid, and the like with polyols such as neopentyl glycol, methyl pentanediol and the like; aromatic polyester polyols which are synthesized by esterification of aromatic dicarboxylic acids such as terephthalic acid, and the like with polyols such as neopentyl glycol, and the like; ester compounds obtained by esterification of polyhydric alcohols such as polycarbonate polyol, acryl polyol, polytetramethylene hexaglyceryl ether (modified hexaglycerin by tetrahydrofuran), and the like with dicarboxylic acids such as fumaric acid, phthalic acid, isophthalic acid, itaconic acid, adipic acid, sebacic acid, maleic acid, and the like; compounds having polyol groups such as monoglyceride obtained by transesterification of polyhydric alcohols such as glycerin with animal- and plant-fatty acid esters; and the like.

Examples of polycarboxylate polyether polyol esters having polycarboxylic acid at a terminal position, which forms the linking chain, include but are not limited to, polycarboxylate polyether polyol esters that are obtained by esterification of polycarboxylic acids such as succinic acid, adipic acid, phthalic acid, hexahydrophthalic acid, tetrahydrophthalic acid, fumaric acid, isophthalic acid, itaconic acid, sebacic acid, maleic acid, trimellitic acid, pyromellitic acid, benzene pentacarboxylic acid, benzene hexacarboxylic acid, citric acid, tetrahydrofuran tetracarboxylic acid, cyclohexane tricarboxylic acid, and the like with polyether polyols described above.

Examples of polycarboxylate polyester polyol esters having polycarboxylic acid at a terminal position, which forms the linking chain include, but are not limited to, polycarboxylate polyester polyol esters obtained by esterification of polycarboxylic acids such as succinic acid, adipic acid, phthalic acid, hexahydrophthalic acid, tetrahydrophthalic acid, fumaric acid, isophthalic acid, itaconic acid, sebacic acid, maleic acid, trimellitic acid, pyromellitic acid, benzene pentacarboxylic acid, benzene hexacarboxylic acid, citric acid, tetrahydrofuran tetracarboxylic acid, cyclohexane tricarboxylic acid, and the like with polyester polyols described above.

Examples of polyepoxide linking chains include, but are not limited to, epichlorohydrin-modified bisphenol type epoxy resins synthesized by the reaction of (methyl)epichlorohydrin with bisphenol A, bisphenol F, modified ethylene oxide thereof, modified propylene oxide thereof; epichlorohydrin-modified hydrogenated bisphenol type epoxy resin prepared by the reaction of (methyl)epichlorohydrin with hydrogenated bisphenol A and hydrogenated bisphenol F, and by the reaction of ethylene oxide-modified or propylene oxide-modified hydrogenated bisphenol A and bisphenol F, and the like.

Non-limiting examples of maleimide derivatives include: N-methylmaleimide, N-ethylmaleimide, N-propylmaleimide, N-n-butylmaleimide, N-tert-butylmaleimide, N-pentylmaleimide, N-hexylmaleimide, N-laurylmaleimide, 2-maleimide ethyl ethylcarbonate, 2-maleimide ethyl isopropylcarbonate, N-ethyl-(2-maleimide ethyl) carbamate; N-cyclohexylmaleimide; N-phenylmaleimide, N-2-methyl phenylmaleimide, N-2-ethyl phenylmaleimide, N-(2,6-diethylphenyl) maleimide, N-2-chlorophenylmaleimide, and N-(4-hydroxyphenyl)maleimide, N,N'-methylene bismaleimide, N,N'-ethylene bismaleimide, N,N'-trimethylene bismaleimide, N,N'-hexamethylene bismaleimide, N,N'-dodecamethylene bismaleimide, polypropylene glycol-bis (3-maleimidepropyl)ether, tetraethylene glycol bis(3-maleimidepropyl)ether, and bis(2-maleimidethyl)carbonate; 1,4-dimaleimide cyclohexane and isophorone bisurethane bis (N-ethylmaleimide); N,N'-(4,4'-diphenylmethane)bismaleimide, N,N'-(4,4'-diphenyloxy)bismaleimide, N,N'-p-phenylene bismaleimide, N,N'-m-phenylenebismaleimide, N,N'-2,4-tolylene bismaleimide, N,N'-2,6-tolylene bismaleimide, N,N'-[4,4'-bis(3,5-dimethylphenyl)methane]bismaleimide, N,N'-[4,4'-bis(3,5-diethylphenyl)methane]bismaleimide, 2-ethylcarbonate ethylmaleimide, 2-isopropyl urethane ethylmaleimide, 2-acryloyl ethylmaleimide, acetoxy ethylmaleimide, isophorone bisurethane bisethylmaleimide, triethyleneglycol biscarbonate bisethylmaleimide, bisethylmaleimide carbonate, 4,9-dioxa-1,12-dodecane bismaleimide, and maleimide derivatives obtained by urethanation reactions of hydroxymaleimides, such as hydroxy ethylmaleimide with polyisocyanates (di-, tri-, etc isocyanates).

As used in the present disclosure and claims, the terms "maleimide derivative", "maleimide oligomer", "radiation-curable maleimide derivative", or similar terms, are intended to mean and include the materials represented by formulae I, II, IIA or III. In accordance with a further embodiment of the present invention, the radiation-curable maleimide derivative material can be blended with other radiation-curable materials, e.g., monomeric materials having unsaturated double bonds in their structure. Such compounds can include, but are not limited to, maleimide derivatives that are not represented by formulae I, II, IIA or III, monomers and oligomers derived from such materials as acrylic acid and methacrylic acid, e.g., (meth)acryloyl derivatives, (meth)acrylamide derivatives, vinyl-containing derivatives, e.g., vinyl ether, vinyl ester and vinyl carboxylate derivatives, styrene derivatives and unsaturated polyesters. By use of the term "(meth)", it is intended that the designated derivative, e.g., the acryloyl derivative, can be substituted with an alkyl substituent, e.g., methyl, and hence the (meth) derivative includes lower alkyl substituted, e.g., alkyl groups of from 1 to 5 carbon atoms, and non-alkyl substituted maleimide derivatives.

As used in the present description and claims, the terms "film, layer or coating comprising a maleimide derivative", "film, layer or coating comprising a maleimide oligomer", or similar terms, are intended to mean and include such overlays prepared by curing, e.g., by radiation, a composition comprising at least one maleimide derivative (as defined above), e.g., a maleimide monomer or oligomer, such as a polymaleimido polymerizable material, e.g., a bismaleimide material, alone or in combination with at least one other radiation-curable unsaturated monomeric materials, such as vinyl- or acrylic-function-containing materials, e.g., a mixture of at least one maleimide derivative and at least one other unsaturated material, such as an acrylate. The term "composition comprising a maleimide derivative" is intended to cover and include compositions containing only maleimide derivatives, and compositions comprising maleimide derivatives and at least one other radiation or thermally curable unsaturated monomeric material (hereinafter referred to collectively as radiation-curable material).

The other radiation-curable unsaturated monomer material(s) can be blended with the maleimide derivative material(s) in various ratios, depending on the physical properties of the film that are desired, e.g., viscosity of the blend, the degree of crosslinking, and hardness of the film. Typically, the weight ratio of the maleimide derivative material(s) to the other radiation-curable unsaturated monomer material(s) can vary widely. In particular, the weight ratio can range from 90:10 to 10:90, more particularly, from 70:30 to 30:70, e.g., from 40:60 to 60:40, such as 50:50. The ratio of the maleimide derivative-containing material to the other radiation-curable unsaturated monomer material can vary between any combination of the recited values inclusive of the specified values.

Radiation curable (meth)acrylic monomer material(s) that can be incorporated into the composition comprising a maleimide derivative include monoacrylates, and polyacrylates, such as diacrylates, triacrylates, tetraacrylates, pentaacrylates, etc. Typically, diacrylates, triacrylates and mixtures of such acrylates are contemplated. As used herein, the terms "acrylic" and "acrylate" are used interchangeably (unless to do so would alter the intended meaning) and include derivatives of acrylic acids, as well as lower alkyl-substituted acrylic acids, e.g., $C_1$-$C_5$ substituted acrylic acids, such as methacrylic acid, ethacrylic acid, etc., unless clearly indicated otherwise. The terms "(meth)acrylic" or "(meth)acrylate" are intended to cover both the acrylic/acrylate and methacrylic/methacrylate forms of the indicated material, e.g., monomer. Since in one contemplated embodiment, the maleimide derivative-containing film is interposed between and adjacent to the photochromic coating and the abrasion-resistant coating, it serves to tie together these coatings and serves as a barrier to protect the photochromic coating. In such circumstances, the maleimide derivative-containing film can be referred to as a "tie layer".

Non-limiting examples of acrylic monomers include polyfunctional acrylates, e.g., di-, tri-, tetra-, and penta-functional acrylates, and monofunctional acrylates, e.g., a monomer containing a single acrylic functionality, hydroxy-substituted monoacrylates and alkoxysilyl alkylacrylates, such as trialkoxysilylpropylmethacrylate.

Many acrylates can be represented by the following general formula IV,

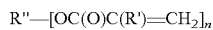    IV wherein R" is an aliphatic or aromatic group containing from 2 to 20 carbon atoms and optionally from 1 to 20 alkyleneoxy linkages; R' is hydrogen or an alkyl group containing from 1 to 4 carbon atoms, and n is an integer of 1 to 5. When n is greater than 1, R" is a linking group that links the acrylic functional groups together. Typically, R' is hydrogen or methyl, and n is an integer of from 1 to 3. More specifically, diacrylates (when n is 2) may be represented by general formula V,

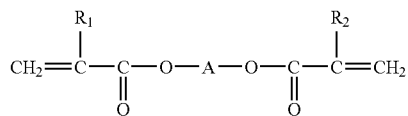    V wherein $R_1$ and $R_2$ may be the same or different and are each selected from hydrogen or alkyl groups containing from 1 to 4 carbon atoms, e.g., methyl, and A is a hydrocarbyl linking group of, for example, from 1 to 20 carbon atoms, e.g., an alkylene group, one or more oxyalkylene group(s) [or mixture of different oxyalkylene groups]; or a group of the following general formula VI,

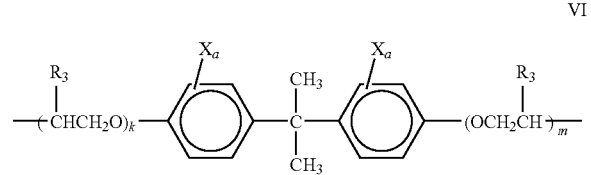    VI wherein each $R_3$ is a hydrogen atom or an alkyl group of from 1 to 4 carbon atoms, e.g., methyl; X is a halogen atom, e.g., chlorine; a is an integer of from 0 to 4, e.g., 0 to 1, representing the number of halogen atoms substituted on the benzene ring; and k and m are numbers of from 0 to 20, e.g., 1 to 15, or 2 to 10. The values of k and m are average numbers and when calculated may be a whole number or a fractional number.

Acrylates having an epoxy group can be represented by the following general formula VII,

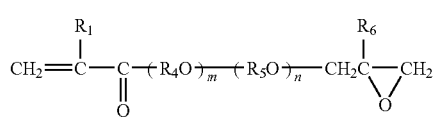    VII wherein $R_1$ and $R_6$ can be the same or different and are each chosen from hydrogen or an alkyl group of from 1 to 4 carbon atoms, e.g., methyl; $R_4$ and $R_5$ are alkylene groups containing from 2 to 3 carbon atoms, e.g., ethyleneoxy and propyleneoxy, and m and n are numbers of from 0 to 20, e.g., 0 or 1 to 15 or 2 to 10. When one of m and n is 0 and the other is 1, the remaining R group can be an aromatic group of the following formula VIII,

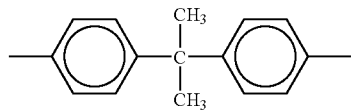    VIII e.g., a group derived from the 2,2'-diphenylenepropane radical, which phenyl groups may be substituted with $C_1$ to $C_4$ alkyl groups or halogens, e.g., methyl and/or chlorine.

In the following detailed examples of identified acrylic monomer materials, the term "acrylate" is intended to mean and include the corresponding alkyl acrylates containing from 1 to 4 carbon atoms in the alkyl group, particularly the corresponding methacrylate; and where the alkyl acrylate, e.g., methacrylate, is identified, the corresponding acrylate is contemplated. For example, reference to hydroxyethyl acrylate in the examples includes hydroxyethyl methacrylate, hydroxyethyl ethacrylate, etc.; and reference to ethylene glycol diacrylate includes, for example, ethylene glycol dimethacrylate, ethylene glycol diethacrylate, etc. Non-limiting examples of such acrylic monomer materials include:

Hydroxyethyl acrylate,
Hydroxypropyl acrylate,
Hydroxybutyl acrylate,
Hydroxy-poly(alkyleneoxy)alkyl acrylate,
Caprolactone acrylate,
Ethylene glycol diacrylate,
Butanediol diacrylate,
Hexanediol diacrylate,
Hexamethylene diacrylate,
Diethylene glycol diacrylate,
Triethylene glycol diacrylate,
Tetraethylene glycol diacrylate,
Polyethylene glycol diacrylate,
Dipropylene glycol diacrylate,
Tripropylene glycol diacrylate,
Tetrapropylene glycol diacrylate,
Polypropylene glycol diacrylate,
Glyceryl ethoxylate diacrylate,
Glyceryl propoxylate diacrylate,
Trimethylolpropane triacrylate
Trimethylolpropane ethoxylate triacrylate,
Trimethylolpropane propoxylate triacrylate,
Neopentyl glycol diacrylate,
Neopentyl glycol ethoxylate diacrylate,
Neopentyl glycol propoxylate diacrylate,
Monomethoxy trimethylolpropane ethoxylate diacrylate,
Pentaerythritol ethoxylate tetraacrylate,
Pentaerythritol propoxylate tetraacrylate,
Dipentaerythritol pentaacrylate,
Dipentaerythritol ethoxylate pentaacrylate,
Dipentaerythritol propoxylate pentaacrylate,
Di-trimethylolpropane ethoxylate tetraacrylate,
Bisphenol A ethoxylate diacrylate containing from 2 to 20 ethoxy groups,
Bisphenol A propoxylate diacrylate containing from 2 to 20 propoxy groups,
Bisphenol A alkoxylated diacrylate containing a mixture of from 2 to 20 ethoxy and propoxy groups, Bisphenol A glycerolate dimethacrylate,
Bisphenol A glycerolate (1 glycerol/1 phenol)dimethacrylate,
Glycidyl acrylate,
β-methylglycidyl acrylate,
Bisphenol A-monoglycidyl ether acrylate,
4-glycidyloxybutyl methacrylate,
3-(glycidyl-2-oxyethoxy)-2-hydroxypropyl methacrylate,
3-(glycidyloxy-1-isopropyloxy)-2-hydroxypropyl acrylate,
3-(glycidyloxy-2-hydroxypropyloxy)-2-hydroxypropyl acrylate, and
3-(Trimethoxysilyl)propyl methacrylate.

Compounds having vinyl ether groups that can be used in the radiation-curable maleimide derivative containing coating composition include, but are not limited to, monovinyl ethers, divinyl ethers and polyvinyl ethers in which a vinyl ether group is connected with an alkylene group; and in which a vinyl ether group is connected with at least one group with and without substituents selected from alkyl, cycloalkyl and aromatic groups, via at least one linkage selected from an ether linkage, a urethane linkage and an ester linkage. In particular, there can be mentioned alkyl vinyl ethers having a terminal group substituted with hydrogen, halogen, hydroxyl and amino atoms/groups, typically having a chain length of from 1 to 22 carbon atoms; divinyl ethers, such as divinyl ethers of polyols having, for example, 2 to 6 hydroxyl groups, including ethylene glycol, propylene glycol, butylene glycol, 3-methyl propane trio and pentaerythritol; and a cycloalkyl vinyl ether having a terminal group substituted with hydrogen, halogen, hydroxyl and amino atoms/groups;

Examples of such compounds include, but are not limited to, methyl vinyl ether, hydroxymethyl vinyl ether, chloromethyl vinyl ether, ethyl vinyl ether, 2-hydroxyethyl vinyl ether, 2-chloroethyl vinyl ether, diethyl aminoethyl vinyl ether, propyl vinyl ether, 3-hydroxypropyl vinyl ether, 2-hydroxypropyl vinyl ether, 3-chloropropyl vinyl ether, 3-aminopropyl vinyl ether, isopropyl vinyl ether, butyl vinyl ether, 4-hydroxybutyl vinyl ether, isobutyl vinyl ether, 4-aminobutyl vinyl ether, pentyl vinyl ether, isopentyl vinyl ether, hexyl vinyl ether, 1,6-hexanediol monovinyl ether, heptyl vinyl ether, 2-ethylhexyl vinyl ether, octyl vinyl ether, isooctyl vinyl ether, nonyl vinyl ether, isononyl vinyl ether, decyl vinyl ether, isodecyl vinyl ether, dodecyl vinyl ether, isododecyl vinylether, tridecyl vinyl ether, isotridecyl vinyl ether, pentadecyl vinyl ether, isopentadecyl vinyl ether, hexadecyl vinyl ether, octadecyl vinyl ether, methylene glycol divinyl ether, ethylene glycol divinyl ether, propylene glycol divinyl ether, 1,4-butanediol divinyl ether, 1,6-hexanediol divinyl ether, cyclohexanediol divinyl ether, trimethylolpropane trivinyl ether, and pentaerythritol tetravinyl ether.

Cycloalkyl vinyl ethers include, but are not limited to, cyclopropyl vinyl ether, 2-hydroxycyclopropyl vinyl ether, 2-chlorocyclopropyl vinyl ether, cyclopropylmethyl vinyl ether, cyclobutyl vinyl ether, 3-hydroxycyclobutyl vinyl ether, 3-chlorocyclobutyl vinyl ether, cyclobutylmethyl vinyl ether, cyclopentyl vinyl ether, 3-hydroxycyclopentyl vinyl ether, 3-chlorocyclopentyl vinyl ether, cyclopentylmethyl vinyl ether, cyclohexyl vinyl ether, 4-hydroxycyclohexyl vinyl ether, cyclohexylmethyl vinyl ether, 4-aminocyclohexyl vinyl ether, cyclohexanediol monovinyl ether, cyclohexanedimethanol monovinyl ether, and cyclohexanedimethanol divinyl ether.

Other non-limiting examples of vinyl ethers that can be used include ethylene glycol methyl vinyl ether, diethylene glycol monovinyl ether, diethylene glycol methylvinyl ether, diethylene glycol divinyl ether, triethylene glycol monovinyl ether, etc. See, for example, the vinyl ethers specified in column 19, line 26 through column 20, line 27 of U.S. Pat. No. 6,410,611 B1.

Other unsaturated monomeric materials that can be included in the curable maleimide derivative-containing composition include, but are not limited to, aminoplast acrylates, i.e., melamine acrylate, vinyl acetate, vinyl and vinylidene halides and amides, i.e., methacrylamide, acrylamide, diacetone acrylamide, vinyl and vinylidene esters, vinyl and vinylidene ethers, vinyl and vinylidene ketones, butadiene, vinyl aromatics, i.e., styrene, alkyl styrenes, halostyrenes, alkoxystyrenes, divinyl benzenes, vinyl toluene, and the like, as well as prepolymers such as acrylated epoxides, polyesters and polyurethanes.

The aforedescribed amounts of additional radiation curable unsaturated monomers, are calculated based on the total quantity of polymerizable materials (resin solids) comprising the curable maleimide derivative-containing film composition, not including other components, such as non-polymerizable organic diluents, e.g., solvents, photoinitiators, stabilizers, plasticizers and other such components. The total of all of the various polymerizable materials comprising the curable film composition will, of course, equal 100 percent.

Radiation curable (meth)acrylic materials and the other described unsaturated monomers are typically commercially available; and, if not commercially available, can be prepared by procedures well known to those skilled in the art. Examples of commercial acrylate materials can be found in U.S. Pat. No. 5,910,375, particularly in the disclosure found in column 8, lines 20-55, and in column 10, lines 5-36. Commercially available acrylate materials are available from various manufacturers and include those sold under the trade names, SARTOMER, EBECRYL, and PHOTOMER.

The maleimide derivative-containing composition can also contain ultraviolet light stabilizers, which may be a UV absorber and/or a hindered amine light stabilizer (HALS). Non-limiting examples of UV absorbers include the benzotriazols and hydroxybenzophenones. Care should be observed, however, in the case of UV absorbers that sufficient UV radiation of the appropriate wavelength is permitted to pass through the maleimide derivative-containing layer to activate the photochromic materials(s) within the photochromic polymeric coating. HALS stabilizers are available from Ciba-Geigy under the TINUVIN trade name. The amount of light stabilizer that is used is that amount that is effective to stabilize the composition, i.e., an effective amount, which will depend on the specific compounds chosen, but typically is up to 20 parts by weight relative to 100 parts by weight of the polymerizable resin components. The UV absorber is also used in effective amounts, which is typically up to 10 parts by weight, e.g., 0.05 to 5 parts by weight, relative to 100 parts of the polymerizable resin components.

Additional additives that can be used include, but are not limited to, wetting agents, solvents if required to achieve the appropriate viscosity, fluorinated additives, rheology modifiers, surfactants, e.g., fluorosurfactants, flow and leveling agents, antioxidants, antifoaming agents, rheology modifiers, surfactants, e.g., fluorosurfactants, stabilizers, antioxidants, etc. Such materials are well known to those skilled in the art. Examples of some commercial surfactants and antioxidants/stabilizers can be found in column 10, lines 43-54 of the aforementioned '375 patent. Other non-limiting examples of such additives include silicones, modified silicones, silicone acrylates, hydrocarbons, and other fluorine-containing compounds.

As disclosed in copending U.S. patent application Ser. No. 10/793,589 filed on even date hereof by W. Blackburn et al and titled "Photochromic Optical Article", it is contemplated that an adhesion-enhancing amount of at least one adhesion promoting material (adhesion promoter) can be incorporated into the composition comprising the maleimide derivative. By adhesion-enhancing amount is meant that the compatibility of the maleimide derivative-containing film to a superimposed organo silane-containing abrasion-resistant coating (as described herein) applied to the maleimide derivative-containing film is enhanced. Typically, from 0.1 to 20 weight percent of at least one adhesion promoter(s) is incorporated into the coating composition comprising the maleimide derivative prior to applying it onto the photochromic coating. More particularly, from 0.5 to 16, e.g., 0.5 to 10, weight percent, more particularly 0.5 to 8, e.g., 5, weight percent, of at least one adhesion promoter is incorporated into the maleimide derivative-containing composition. The amount of adhesion promoter incorporated into the maleimide derivative-containing composition can range between any combination of the aforestated values, inclusive of the recited values.

Among the adhesion promoter materials that can be incorporated into the maleimide derivative-containing film to enhance its compatibility with an abrasion-resistant coating, e.g., an abrasion-resistant coating comprising organo-silane material, include, but are not limited to, adhesion promoting organo-silane materials, such as aminoorganosilanes, and silane coupling agents, organic titanate coupling agents and organic zirconate coupling agents.

Aminoorganosilanes that can be used are primary, secondary and tertiary aminoorganosilanes, particularly aminoorganosilanes represented by the following general formula IX:

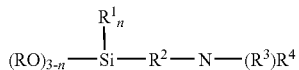
IX wherein n is an integer of from 0 to 2, usually 0 or 1; each R is independently chosen from $C_1$-$C_8$ alkyl, usually $C_1$-$C_4$ alkyl, such as methyl, ethyl, propyl and butyl, a $C_1$-$C_4$ alkoxy $C_1$-$C_8$ alkyl, typically $C_1$-$C_3$ alkoxy $C_1$-$C_3$ alkyl, such as methoxymethyl, methoxyethyl, ethoxymethyl, etc., or $C_6$-$C_{10}$ aryl, e.g., $C_6$-$C_8$ aryl; $R^1$ is hydrogen, a $C_1$-$C_8$ alkyl, usually $C_1$-$C_3$ alkyl, or $C_6$-$C_{10}$ aryl, e.g., $C_6$-$C_8$ aryl; $R^2$ is a divalent $C_1$-$C_{10}$ alkylene, $C_2$-$C_{10}$ alkenylene or phenylene, usually a $C_2$-$C_5$ alkylene, such as ethylene, trimethylene, etc., or $C_2$-$C_5$ alkenylene, such as vinylene, 1-propenylene, butenylene, 2-pentenylene, etc.; each $R^3$ and $R^4$ are independently chosen from hydrogen, $C_1$-$C_8$ alkyl, usually $C_1$-$C_3$ alkyl, $C_1$-$C_8$ hydroxyalkyl, usually $C_2$-$C_3$ hydroxyalkyl, $C_1$-$C_8$ aminoalkyl, usually $C_2$-$C_3$ aminoalkyl, $C_4$-$C_7$ cycloalkyl, e.g., $C_5$-$C_6$ cycloalkyl, $C_6$-$C_{10}$ aryl, e.g., $C_6$-$C_8$ aryl, (meth)acrylyloxy $C_1$-$C_4$ alkyl (the alkyl group being optionally substituted with a functional group such as hydroxy), e.g., (meth) acrylyloxy-2-hydroxypropyl, or $R^3$ and $R^4$ combine to form a cycloalkyl group of from 4 to 7 carbon atoms, e.g., 5 to 6 carbon atoms, or a $C_4$-$C_7$ heterocyclic group wherein the hetero atom(s) are oxygen and/or nitrogen, e.g., morpholino and piperazino, or are a group represented by the general formula IXA

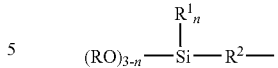
IXA wherein R, $R^1$, $R^2$ and n are as defined with respect to general formula IX. Also included in the compounds of formula IX are the partial and total hydrolysates of compounds represented by that formula.

Non-limiting examples of aminosilanes that can be used include aminopropyl trimethoxysilane, aminopropyl triethoxysilane, aminoethyl trimethoxysilane, aminoethyl triethoxysilane, methylaminopropyl trimethoxysilane, aminobutylmethyl dimethoxysilane, aminopropyldimethyl methoxysilane, aminopropylmethyl dimethoxysilane, aminopropyldimethyl ethoxysilane, aminobutylmethyl dimethoxysilane, bis-(gamma-trimethoxysilylpropyl)amine, N-(3-methacryloxy-2-hydroxypropyl)-3-aminopropyl triethoxysilane, N-(3acryloxy-2-hydroxypropyl)-3-aminopropyl triethoxysilane, (N,N-dimethylaminopropyl) trimethoxysilane, (N,N-diethyl-3-aminopropyl)trimethoxysilane, diethylaminomethyl triethoxysilane, bis(2-hydroxyethyl)-3-aminopropyl triethoxysilane, γ-aminopropyl trimethoxysilane, N-(2'-aminoethyl)-3-aminopropyl trimethoxysilane, N-(2'-aminoethyl)-3-aminopropyl triethoxysilane, N-butyl-3-aminopropyl triethoxysilane, N-octyl-3-aminopropyl trimethoxysilane, N-cyclohexyl-3-aminopropyl triethoxysilane, N-(3'-triethoxysilylpropyl)-piperazine, bis-(3-triethoxysilylpropyl)amine, tris-(3-trimethoxysilylpropyl) amine, N,N-dimethyl-3-aminopropyl triethoxysilane, N-methyl-N-butyl-3-aminopropyl triethoxysilane, N-(3'-aminopropyl)-3-aminopropyl triethoxysilane, N-(3'-triethoxysilylpropyl)morpholine, N-phenyl-gamma-aminopropyl trimethoxysilane, and N-phenyl-gamma-amino-2-methylpropyl trimethoxysilane.

Silane coupling agents can be represented by the following general formula X:

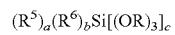
X wherein each $R^5$ is an organofunctional group independently chosen from epoxy, glycidoxy, amino, vinyl, styryl, (meth) acryloxy, mercapto, haloalkyl, e.g., chloroalkyl, ureido, or a hydrocarbon radical having not more than 10 carbon atoms substituted with said organofunctional group; each $R^6$ is a hydrocarbon radical of not more than 20 carbon atoms, that is independently chosen from aliphatic radicals, aromatic radicals or mixtures of such hydrocarbon radicals, e.g., $C_1$-$C_{20}$ alkyl, more particularly, $C_1$-$C_{10}$ alkyl, e.g., $C_1$-$C_6$ alkyl, or phenyl; each R is independently chosen from $C_1$-$C_8$ alkyl, usually $C_1$-$C_4$ alkyl, such as methyl, ethyl, propyl and butyl, a $C_1$-$C_4$ alkoxy $C_1$-$C_8$ alkyl, typically $C_1$-$C_3$ alkoxy $C_1$-$C_3$ alkyl, such as methoxymethyl, methoxyethyl, ethoxymethyl, etc., $C_6$-$C_{10}$ aryl, e.g., $C_6$-$C_8$ aryl or acetoxy; a is the integer 1 or 2, usually 1, b is the integer 0, 1 or 2, e.g., 0, and c is the integer 1, 2, or 3, e.g., 2 or 3, provided that the sum of a+b+c equals 4.

Non-limiting examples of silane coupling agents include: vinyl triacetoxysilane, vinyl trimethoxysilane, vinyl tri(2-methoxyethoxy)silane, vinyl triphenoxysilane, vinyl triisopropoxysilane, vinyl tri-t-butoxysilane, divinyl diethoxysilane, gamma glycidoxypropyl trimethoxysilane, beta-(3,4-epoxycyclohexyl)ethyl trimethoxysilane, allyl triethoxysilane, allyl trimethoxysilane, (3-acryloxypropyl) dimethylmethoxysilane, (3-acryloxypropyl)methyldimethoxysilane, (3-acryloxypropyl)trimethoxysilane, (3-methacryloxypropyl)trimethoxysilane, (methacryloxymethyl)dimethyl ethoxysilane, methacryloxymethyl triethoxysilane, methacryloxymethyl trimethoxysilane, methacryloxypropyl dimethyl ethoxysilane, methacryloxypropyl trimethoxysilane, styrylethyl trimethoxysilane, mercaptomethyl methyldiethoxysilane, 3-mercaptopropyl methyldimethoxysilane, 3-mercaptopropyl triethoxysilane, 3-mercaptopropyl trimethoxysilane, 3,4-epoxy cyclohexylethyl trimethoxysilane, dimethyl diethoxysilane, chloropropyl triethoxysilane, 3-(trimethoxysilyl)propyl methacrylate, ureidopropyl triethoxysilane, mixtures of such silane materials, and at least partial hydrolysates of such silanes.

Non-limiting examples of organic titanate coupling agents include: tetra (2,2-diallyloxymethyl)butyl titanate, di(ditridecyl)phosphito titanate (commercially available as KR 55 from Kenrich Petrochemicals, Inc.); neopentyl(diallyl)oxy trineodecanoyl titanate; neopentyl(diallyl)oxy tri(dodecyl) benzene-sulfonyl titanate; neopentyl(diallyl)oxy tri(dioctyl) phosphato titanate; neopentyl(diallyl)oxy tri(dioctyl) pyrophosphato titanate; neopentyl(diallyl)oxy tri(N-ethylenediamino)ethyl titanate; neopentyl(diallyl)oxy tri(m-amino)phenyl titanate; neopentyl(diallyl)oxy trihydroxy caproyl titanate; isopropyl dimethyacrylisostearoyl titanate; tetraisopropyl(dioctyl) phosphito titanate; mixtures of such titanates, and at least partial hydrolysates thereof.

Non-limiting examples of organic zirconate coupling agents include tetra (2,2-diallyloxymethyl)butyl di(ditridecyl)phosphito zirconate (commercially available as KZ 55 from Kenrich Petrochemicals); neopentyl(diallyloxy)trineodecanoyl zirconate; neopentyl(diallyl)oxy tri(dodecyl)benzene sulfonyl zirconate; neopentyl(diallyloxy)tri(dioctyl) phosphato zirconate; neopentyl(diallyloxy) tri(dioctyl)pyrophosphato zirconate; neopentyl(diallyloxy)tri(N-ethylenediamino)ethyl zirconate; neopentyl(diallyloxy), tri (m-amino)phenyl zirconate; neopentyl(diallyloxy) trimethacryl zirconate; neopentyl(diallyloxy)triacryl zirconate; dineopentyl(diallyloxy) di(p-amino)benzoyl zirconate; dineopentyl(allyl)oxy di(3-mercapto)propionic zirconate; mixtures of such zirconates, and at least partial hydrolysates thereof.

As used in this description and claims, the term "at least partial hydrolysates" is intended to mean and include compounds that are hydrolyzed partially or hydrolyzed completely.

As described earlier, maleimide derivative-containing compositions can be cured without the use of photoinitiators. However, the use of small amounts of one or more photoinitiators will enhance the cure rate and provide a more complete cure in a shorter amount of time. Accordingly, it is contemplated that the curable maleimide derivative-containing composition can also contain at least one photoinitiator. A photoinitiator is not required when the resin formulation is to be cured by an electron beam process.

When used, the photoinitiator is present in amounts sufficient to initiate and sustain the curing of the composition, e.g., an initiating or photoinitiating amount. Photoinitiators are desirably used in the least amount necessary to obtain initiation of the curing process. Generally, the photoinitiator(s) can be present in amounts of from 0.1 to 10 weight percent, such as from 0.5 to 6 weight percent, more generally from 1 to 4 weight percent, based on the total weight of the radiation-curable polymerizable components in the curable maleimide derivative-containing film composition. Photoinitiators are discussed and described subsequently in connection with the photochromic polymer coating. That discussion is applicable here also in connection with the radiation curable maleimide derivative-containing composition, and is hereby incorporated here. Further examples of commercial photoinitiators can be found in column 10, lines 38-43 of U.S. Pat. No. 5,910,375, and in column 11, lines 24-65 of U.S. Pat. No. 6,271,339 B1.

It is also possible to include light sensitizer(s) within the photoinitiator-containing curable maleimide derivative-containing film forming composition for efficient curing. Such sensitizers can be present in varying amounts, e.g., from 0.01 to 10 weight percent. Non-limiting examples of such sensitizers include triethanolamine, methyl diethanolamine, triisopropanolamine, methyl 4-dimethylaminobenzoate, ethyl 4-dimethylamino benzoate, isoamyl 4-dimethylaminobenzoate, (2-dimethylamino)ethyl benzoate, n-butoxy ethyl 4-dimethylaminobenzoate and 2-ethylhexyl 4-dimethylaminobenzoate. See also, International Patent Publication WO 99/03930, which describes the use of aliphatic and aromatic tertiary amines to increase the reactivity of the curing reaction of a composition comprising an aliphatic maleimide.

The curable maleimide derivative film forming composition is prepared by mixing the components of the composition at temperatures that facilitate mixing and blending. The composition can then be applied to the photochromic coating by the same procedures that are described subsequently for applying the photochromic coating to the plastic substrate, e.g., spin coating and dip coating.

Prior to applying the maleimide derivative film forming composition to the photochromic coating, it is common, but not required, to treat the surface of the photochromic coating to enhance adhesion of the maleimide derivative-containing film to the photochromic coating. Effective treatments include activated gas treatment, such as treatment with a low temperature plasma or corona discharge. A particularly desirable surface treatment is a low temperature plasma treatment. This method allows treatment of the surface to enhance adhesion of a superimposed film or coating, and is a clean and efficient way to alter the physical surface, e.g., by roughening and/or chemically altering the surface without affecting the rest of the article. Inert gases, such as argon, and reactive gases, such as oxygen, have been used as the plasma gas. Inert gases will roughen the surface, while reactive gases such as oxygen will both roughen and chemically alter slightly the surface exposed to the plasma, e.g., by producing hydroxyl or carboxyl units on the surface. Oxygen is used as the plasma gas in one contemplated embodiment because it is considered that it provides a slight, but effective, physical roughening of the surface along with a slight, but effective, chemical modification of the surface. Naturally, the extent of the surface roughening and/or chemical modification will be a function of the plasma gas and the operating conditions of the plasma unit (including the length of time of the treatment).

It is reported that a conventional plasma treatment alters the top 20 to 200 angstroms of the surface (a few molecular layers.) The operating conditions of the plasma unit are a function of the design and size, e.g., volume, of the plasma chamber, power and construction of the plasma unit. The frequency at which the plasma operates can vary, e.g., from a low frequency such as 40 kHz to microwave frequencies such as 2.45 GHz. Similarly, the power at which the plasma unit operates can vary, e.g., from 50 to 1000 Watts, e.g., 50 to 750, such as 50 to 150 Watts. The pressure at which the plasma unit operates can also vary; however, it has been observed that low pressures are generally less destructive physically of the treated surface, which is desired. Low pressures, e.g., from 20 to 65 or 70 Pa are believed to be useful. The time that the surface is exposed to the plasma can also vary and will be a function of the type of surface being treated, i.e., the type of polymer used for the photochromic polymeric coating. However, care should be taken that the surface is not treated for too long since lengthy periods of treatment can be counterproductive. One skilled in the art can readily determine the minimum time required to provide a plasma treated surface that enhances adhesion of the maleimide derivative-containing layer/film to the photochromic coating. For ophthalmic articles, such as lenses, the length of the plasma treatment will generally vary from 1 to 10 minutes, e.g., 1 to 5 minutes. One contemplated plasma treatment involves use of an oxygen plasma generated by a Plasmatech machine operating at a power level of 100 Watts for from 1 to 10, e.g., 1 to 5 minutes, while introducing 100 ml/minute of oxygen into the vacuum chamber of the Plasmatech machine.

The surface of the coating or article subjected to plasma treatment will typically be at room temperature; however, if desired the surface can be preheated slightly. It should be noted that plasma treatment will tend to increase the temperature of the surface (and article) treated. Consequently, the temperature of the surface during treatment will be a direct function of the length of the plasma treatment. The temperature of the surface to be subjected to a plasma treatment should be maintained at temperatures below that at which the surface is not significantly adversely affected (other than the intended increase in surface area by roughening and slight chemical modification.) One skilled in the art can readily select the operating conditions of the plasma unit, vis-à-vis, the substrate treated, to achieve an improvement in the adhesion of a superimposed film/coating on the plasma treated surface. Examination of the treated surface can be performed by atomic force microscopy to determine the relative extent of the physical change in the surface. Generally, a low temperature, microwave frequency, oxygen plasma can be used for treatment of a photochromic coating to which a radiation-cured maleimide derivative-containing coating/film is applied.

The curable maleimide derivative film forming composition is applied in a manner to obtain a substantially homogeneous cured film, the thickness of which can vary. In one contemplated embodiment, the thickness is less than 200 microns, usually less than 100 microns, e.g., not more than 50 microns. In another contemplated embodiment, the film can range in thickness from 2 to 20 microns, e.g., 2 to 15 microns, more typically from 8 to 12 microns. The film thickness may range between any combinations of these values, inclusive of the recited values. The term "film" is generally considered by those skilled in the coating art to be a layer with a thickness of not more than 20 mils (500 microns); however, as used in this disclosure and claims, the term film when used in relation to the radiation-cured, maleimide derivative-containing film is defined as having a thickness, as herein described.

The applied film is then exposed to UV radiation (or to an Electron Beam process, if UV radiation is not used), i.e., radiation in the range of 200 and 450 nanometers. Typically, this is accomplished by passing the film (or the substrate on which the film is applied) under a commercially available UV or excimer lamp on a conveyer moving at predetermined speeds. The radiation can contain in its spectra both visible and ultraviolet light. Any appropriate type of UV lamp, e.g., mercury vapor or pulsed xenon, can be used. The radiation can be monochromatic or polychromatic, incoherent or coherent and should be sufficiently intense to initiate the polymerization. If a photoinitiator is used, the absorbance spectra of the photoinitiator(s) should be matched with the spectral output of the UV lamp (bulb), e.g., an H bulb, D bulb, Q bulb or V bulb, for the highest curing efficiency. The cure process is generally more efficient when oxygen, e.g., air, is excluded from the cure process. This can be accomplished by using a nitrogen blanket over the applied film during the cure process.

Following the radiation cure, e.g., UV cure, a thermal post cure can be used to cure completely the film. Heating in an oven at 212° F. (100° C.) for from 0.5 to 3 hours is usually adequate to thoroughly cure the film. The discussion respecting radiation curing of the photochromic coating is also applicable here in connection with the cure of the maleimide derivative-containing film, and accordingly that discussion is incorporated here.

Alternatively, the maleimide derivative-containing film can be cured thermally, although thermal curing is less desirable. For example, a thermal azo-type or peroxy-type free radical initiator can be incorporated into the film and the film cured by infrared heating or by placing the film (or the substrate containing the film) in a conventional oven, e.g., a convection oven, maintained at temperatures sufficient to cure the film. Examples of such free radical initiators are described herein in relation to curing the photochromic coating composition, and that discussion is applicable here. In a further contemplated embodiment, the maleimide derivative-containing film can be cured with a combination of a thermal initiator, as described above, and a photoinitiator. Non-limiting examples of photoinitiators are described herein in relation to the photopolymerization of the photochromic polymeric coating. That discussion is applicable here and is incorporated herein. When the thermal curing of the maleimide derivative-containing film is used, either alone or in combination with a photoinitiator, e.g., using radiation curing, one or more of the other unsaturated monomer material(s) incorporated with the maleimide derivative material(s) will be monomer materials that are also thermally curable.

Rigid substrates to which the photochromic polymeric coating are applied can vary and include any rigid substrate that will support a photochromic polymeric coating. Non-limiting examples of such rigid substrates include: paper, glass, ceramics, wood masonry, textiles, metals and organic polymeric materials. The particular substrate used will depend on the particular application that requires both a rigid substrate and a photochromic coating. In a desired embodiment, the rigid substrate is transparent. Polymeric substrates that can be used in preparing the photochromic articles of the present invention include organic polymeric materials and inorganic materials such as glass. As used herein, the term "glass" is defined as being a polymeric substance, e.g., polymeric silicates. Glass substrates can be of any type suitable for the intended purpose; but, is desirably a clear, low colored, transparent glass such as the well-known silica type of glass, particularly soda-lime-silica glass. The nature and composition of various silica glasses is well known in the art. The glass can be strengthened by either thermal or chemical tempering. Polymeric organic substrates that can be used to prepare the photochromic articles described herein, are any of the currently known (or later discovered) plastic materials that are chemically compatible with the photochromic polymeric coating applied to the surface of the substrate. Particularly contemplated are the art-recognized synthetic resins that are useful as optical substrates, e.g., organic optical resins that are used to prepare optically clear castings for optical applications, such as ophthalmic lenses.

Non-limiting examples of organic substrates that can be used as polymeric organic substrates are polymers, i.e., homopolymers and copolymers, prepared from monomers and mixtures of monomers disclosed in U.S. Pat. No. 5,962,617 and from column 15, line 28 to column 16, line 17 of U.S. Pat. No. 5,658,501. Such organic substrates can be thermoplastic or thermoset polymeric substrates, e.g., transparent, more particularly optically clear, substrates having a refractive index that desirably ranges from 1.48 to 1.74, e.g., 1.50 to 1.67.

Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc; polyurea-polyurethane (polyurea urethane) polymers, which are prepared, for example, by the reaction of a polyurethane prepolymer and a diamine curing agent, a composition for one such polymer being sold under the trademark TRIVEX by PPG Industries, Inc; polyol (meth)acryloyl terminated carbonate monomers; diethylene glycol dimethacrylate monomer; ethoxylated phenol methacrylate monomers; diisopropenyl benzene monomer; ethoxylated trimethylol propane triacrylate monomers; ethylene glycol bismethacrylate monomer; poly(ethylene glycol)bismethacrylate monomers; urethane acrylate monomers; poly(ethoxylated bisphenol A dimethacrylate) monomers; poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanate(s) and/or isothiocyanate(s) with polythiol(s) or polyepisulfide monomer(s), either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, e.g., to form interpenetrating network products. The exact chemical nature of the organic substrate is not critical to the present invention. However, the organic polymeric substrate should be chemically compatible with the photochromic polymeric coating applied to the surface of the substrate. For optical applications, the substrate should be transparent, more desirably optically clear.

The polymeric organic substrate used to prepare the photochromic articles of the present invention can have a protective coating, e.g., an abrasion-resistant coating, on its surface. For example, commercially available thermoplastic polycarbonate optical lenses are typically sold with an abrasion-resistant coating, e.g., a hard coat, already applied to its surface(s) because the surface tends to be readily scratched, abraded or scuffed. An example of such a lens is the Gentex polycarbonate lens (available from Gentex Optics) that is sold with a hard coat already applied to the polycarbonate surface. As used in this disclosure and claims, the terms "polymeric organic-substrate" (or similar terms) or "surface" of such a substrate, is intended to mean and include either the polymeric organic substrate itself or such a substrate with a coating, e.g., protective coating and/or primer, on the substrate. Thus, when reference is made in this disclosure or claims to applying a primer coating or photochromic polymeric coating to the surface of the substrate, such reference includes applying such a coating to the polymeric organic substrate per se or to a coating, e.g., an abrasion-resistant coating or primer on the surface of the substrate. Hence, the term "substrate" includes substrates having a protective coating or primer on its surface. The coating can be any suitable coating (other than a photochromic coating) and is not limited to an abrasion-resistant coating (hard coat), e.g., any protective coating, primer coating or even a coating that provides additional functional properties to the article of which the substrate is a part.

The use of photochromic organic coatings on plastic substrates, particularly plastic substrates such as thermoplastic polycarbonates, has been described. In accordance with the present invention, any organic polymeric material that can be used as a coating with the chosen organic substrate and which will function as a host material for the organic photochromic materials/compounds selected for use can be used. Normally, the host organic polymeric coating has sufficient internal free volume for the photochromic material to function efficiently, e.g., to change from a colorless form to a colored form that is visible to the naked eye in response to ultraviolet (UV) radiation, and to change back to the colorless form when the UV radiation is removed. Otherwise, the precise chemical nature of the organic coating that is used as the host material for the photochromic material(s) is not critical.

Non-limiting examples of such organic polymeric materials include polyurethane-based coatings, such as those described in U.S. Pat. Nos. 6,107,395 and 6,187,444 B1, and International Patent Publication WO 01/55269; epoxy resin-based coatings, such as those described in U.S. Pat. No. 6,268,055 B1; acrylic/methacrylic monomer-based coatings, such as those described in U.S. Pat. No. 6,602,603, International Patent Publications WO 96/37593 and WO 97/06944, and U.S. Pat. Nos. 5,621,017 and 5,776,376; aminoplast, e.g., melamine type, resins, such as those described in U.S. Pat. Nos. 6,506,488 B1 and 6,432,544 B1; coatings comprising hydroxyl-functional components and polymeric anhydride-functional components, e.g., polyanhydride coatings, such as those described in U.S. Pat. No. 6,436,525 B1; polyurea urethane coatings, such as those described in column 2, line 27 to column 18, line 67 of U.S. Pat. No. 6,531,076B2; and coatings comprising N-alkoxymethyl(meth)acrylamide functional polymers, such as those described in U.S. Pat. No. 6,060,001.

Of particular interest are photochromic polyurethane-based coatings, photochromic polyacrylic or polymethacrylic-based coatings [referred to collectively as poly (meth)acrylic-based coatings], photochromic aminoplast resin-based coatings, photochromic polyurea urethane-based coatings, and photochromic epoxy resin-based coatings. Of special interest are the optically clear photochromic polyurethane, polyurea urethane, epoxy and poly(meth)acrylic-based coatings for use on transparent, e.g., optically clear, plastic substrates for ophthalmic applications, such as plano and vision correcting ophthalmic lenses, sun lenses and goggles, commercial and residential windows, automotive and aircraft transparencies, helmets, plastic sheeting, clear films, etc.

The term "transparent", as used in this disclosure and claims in connection with a substrate, film, material or coating, is intended to mean that the indicated coating, film, substrate or material, such as the plastic substrate, the non-activated photochromic coating, the radiation-cured maleimide derivative-containing film, and coatings superimposed or superposed on the radiation-cured maleimide derivative-containing film, have a light transmission of at least 70%, typically at least 80%, and more typically at least 85%. By the term "optically clear", as used in this disclosure and claims, is meant that the specified item has a light transmission that satisfies commercially accepted and regulatory values for optical, e.g., ophthalmic, articles.

Polyurethanes that can be used to prepare a photochromic polyurethane coating are those produced by the reaction of an organic polyol component and an isocyanate component, as more fully described in column 3, line 4 through column 6, line 22 of U.S. Pat. No. 6,187,444 B1. More particularly, the polyurethanes are produced from a combination of at least one hard segment producing organic polyol and at least one soft segment producing organic polyol. Generally, the hard segment results from the reaction of the isocyanate and a chain extender; and the soft segment results from the reaction of the isocyanate with a polymer backbone component such as a polycarbonate polyol, a polyester polyol or a polyether polyol, or mixtures of such polyols. The weight ratio of hard segment producing polyols to soft segment-producing polyols can vary from 10:90 to 90:10.

The relative amounts of the components comprising the polyurethane reaction mixture can be expressed as a ratio of the available number of reactive isocyanate groups to the available number of reactive hydroxyl groups, e.g., a ratio of NCO:OH groups of from 0.3:1.0 to 3.0:1.0. The isocyanate component can be an aliphatic, aromatic, cycloaliphatic or heterocyclic isocyanate, or mixtures of such isocyanates. Typically, the isocyanate component is selected from blocked or unblocked aliphatic or cycloaliphatic isocyanates, or mixtures of such isocyanates.

As further described in U.S. Pat. No. 6,107,395, polyurethanes suitable as a photochromic host material can be prepared from an isocyanate reactive mixture comprising (i) from 40 to 85 weight percent of one or more polyols having a nominal functionality of from 2 to 4 and molecular weights of from 500 to 6000 g/mole, (ii) from 15 to 60 weight percent of one or more diols or triols or mixtures thereof having a functionality of from 2 to 3 and molecular weights of from 62 to 499, and (iii) an aliphatic polyisocyanate having a functionality of less than 3, e.g., 2.

The previously mentioned U.S. Pat. No. 6,602,603 describes reaction mixtures for poly(meth)acrylic host materials for photochromic materials as comprising at least two difunctional (meth)acrylate monomers, which can have from greater than 3 to less than 15 alkoxy units. In one described embodiment, a difunctional (meth)acrylate has the reactive acrylate groups connected by a straight or branched chain alkylene group, which usually contains from 1 to 8 carbon atoms; while a second difunctional (meth)acrylate has the reactive acrylate groups connected by ethylene oxide, propylene oxide, butylene oxide or mixtures of such oxide groups in random or block order.

Epoxy resin-based coatings described in U.S. Pat. No. 6,268,055 B1 are those prepared by the reaction of a composition comprising an epoxy resin or polyepoxide, e.g., polyglycidyl ethers of aliphatic alcohols and phenols, epoxy-containing acrylic polymers, polyglycidyl esters of polycarboxylic acids and mixtures of such epoxy-containing materials, with a curing agent, e.g., a polyacid comprising a half-ester formed from reacting an acid anhydride with an organic polyol.

Aminoplast resin-based coatings are described in U.S. Pat. No. 6,432,544 B1 and 6,506,488. These coatings are the reaction product of material(s) having at least two different functional groups chosen from hydroxyl, carbamate, urea or mixtures of such functional groups, and an aminoplast resin, e.g., a crosslinking agent. Materials having at least two different functional groups are described in the '444 patent from column 3, line 40 through column 12, line 23, and in the preceding disclosure with respect to the aminoplast tie layer. The aminoplast resin is a condensation product of an amine or amide with an aldehyde, e.g., formaldehyde, acetaldehyde, crotonaldehyde, benzaldehyde and furfural. The amine or amide can be melamine, benzoguanamine, glycoluril, urea and similar compounds. Melamine is typically used. Typically, the aminoplast resin has at least two reactive groups. Non-limiting examples of aminoplast resins are described in the '444 patent in column 12, lines 49 to 67.

The amount of photochromic coating applied to at least one surface of the rigid substrate is that amount which provides a sufficient quantity of organic photochromic material to produce a coating that exhibits a desired change in optical density ($\Delta OD$) when the cured coating is exposed to ultraviolet (UV) radiation, i.e., a photochromic amount. Typically, the change in optical density measured at 22° C. (72° F.) after 30 seconds of UV exposure is at least 0.05, more typically at least 0.15, and still more typically at least 0.20. The change in optical density after 15 minutes of UV exposure is typically at least 0.10, more typically at least 0.50, and still more typically at least 0.70.

Stated differently, the amount of active photochromic material used in the photochromic coating can range from 0.5 to 40.0 weight percent, based on the total weight of monomer(s)/resin(s) used to produce the coating. The relative amounts of photochromic material(s) used will vary and depend in part upon the relative intensities of the color of the activated form of the photochromic compound(s), the ultimate color desired, and the solubility or dispersibility of the photochromic material(s) in the polymeric coating. Care should be taken to avoid use of amounts of photochromic material, which cause crystals of the photochromic material(s) to be formed within the coating. Typically, the concentration of active photochromic material(s) within the photochromic coating ranges from 1.0 to 30 weight percent, more typically, from 3 to 20 weight percent, and still more typically, from 3 to 10 weight percent (based on the total weight of monomer(s)/resin(s) used to produce the coating.) The amount of photochromic material in the coating can range between any combination of these values, inclusive of the recited values.

The bleach rate of the photochromic coating, as reported in terms of the fading half-life (T ½), is typically not more than 500 seconds, more typically not more than 190 seconds, and still more typically not more than 115 seconds. The half-life bleach rate is the time interval in seconds for the change in optical density ($\Delta OD$) of the activated form of the photochromic coating to reach one half the highest $\Delta OD$ after removal of the source of activating light. The aforedescribed values for change in optical density and bleach rate are measured at 22° C. (72° F.).

The photochromic coating applied to the surface of the plastic substrate will typically have a thickness of at least 3 microns, more typically at least 5 microns, still more typically, at least 10 microns, e.g., at least 20 or 30 microns. The applied photochromic coating will also usually have a thickness of not more than 200 microns, more usually not more than 100 microns, and most usually not more than 50 microns, e.g., not more than 40 microns. The thickness of the photochromic coating can range between any combinations of these values, inclusive of the recited values. For example, the photochromic coating can range from 10 to 50 microns, e.g., 20 to 40 microns. The applied photochromic coating should most desirably be free of cosmetic defects, such as scratches, pits, spots, cracks, inclusions, etc.

Typically, the term "coating" is considered by those knowledgeable in the coating art to be a layer having a thickness of not more than 4 mils (about 100 microns). However, as used in this specification and claims in relation to the photochromic coating, the term coating is defined herein as having a thickness, such as a thickness defined hereinabove. Further, as used in this specification and claims, it is intended that the term "surface of the polymeric substrate" or like terms, i.e., the surface to which the photochromic polymeric coating is applied, include the embodiment in which only at least a portion of the surface of the substrate is coated. Hence, the photochromic coating (and the maleimide derivative-containing film applied to the photochromic coating) may cover only a portion of a surface of the substrate, but typically it is applied to the entire surface of at least one substrate surface.

The hardness of the photochromic coating is not critical, but after application and curing, should desirably be sufficiently hard to be physically/mechanically handled without causing blemishes, e.g., scratches, in the coating. The hardness of the photochromic coating typically is less (softer) than the film prepared from the radiation-cured maleimide derivative-containing composition applied to the photochromic coating, which in turn is typically softer than the abrasion-resistant (hard coat) coating applied to the maleimide derivative-containing film. Thus, the principal coatings applied to the plastic substrate (not including any primer layer that can be applied to the substrate) increase in hardness in the direction of the abrasion-resistant coating. The hardness of coatings or films can be quantified by tests known to the skilled artisan, e.g., Fischer microhardness, pencil hardness or Knoop hardness.

The Fischer microhardness of photochromic polymeric coatings is typically less than 30 Newtons per $mm^2$, more particularly, less than 25, e.g., less than 15, such as 2 or 5, Newtons per $mm^2$. In particular, the Fischer microhardness values will be in the lower portion of the ranges described herein, e.g., from 2 to 25, such as 10 to 15, e.g., 12, Newtons per $mm^2$. The lower range of hardness allows the electrocyclic mechanism discussed previously in relation to photochromic materials to occur with greater efficiency than at higher hardness values. The Fischer microhardness of the photochromic polymeric coatings can range between any combination of the stated values, inclusive of the recited values. Fischer microhardness values can be obtained with a Fischerscope HCV Model H-100 (available from Fischer Technology, Inc.) by taking 3 measurements in the center area of the test sample under conditions of a 100 milliNewton load, 30 load steps, and 0.5 second pauses between load steps at an indentor (Vickers diamond stylus) depth of 2 um (microns).

Photochromic materials, e.g., photochromic compounds or compositions containing such dye/compounds, that can be utilized for the photochromic coating applied to the substrate are inorganic and/or organic photochromic compounds and/or substances containing such organic photochromic compounds that are currently known to those skilled in the art or that are later discovered. The particular photochromic material(s), e.g., compound(s), selected is not critical, and its/their selection will depend on the ultimate application and the color or hue desired for that application. When two or more photochromic compounds are used in combination, they are generally chosen to complement one another to produce a desired color or hue.

Organic photochromic compounds used in the photochromic coating commonly have at least one activated absorption maxima within the visible spectrum of between 300 and 1000, e.g., between 400 and 700, nanometers. The organic photochromic material(s) is incorporated, e.g., dissolved or dispersed, in the photochromic coating, and color when activated, i.e., when exposed to ultraviolet radiation, the photochromic material(s) changes to the color or hue that is characteristic of the colored form of such material(s).

The inorganic photochromic material typically contains crystallites of silver halide, cadmium halide and/or copper halide. Generally, the halide material is the chloride and bromide. Other inorganic photochromic materials can be prepared by the addition of europium (II) and/or cerium (III) to a mineral glass, such as a soda-silica glass. In one embodiment, the inorganic photochromic material(s) are added to molten glass and formed into particles that are incorporated into the coating composition that is used to form the polymeric photochromic coating. Such inorganic photochromic materials are described in the *Kirk Othermer Encyclopedia of Chemical Technology*, $4^{th}$ Edition, Volume 6 pages 322-325.

In one contemplated embodiment, the organic photochromic component of the photochromic coating comprises:
 (a) at least one photochromic organic compound having a visible lambda max of from 400 to less than 550, e.g., from 400 to 525, nanometers; and
 (b) at least one photochromic organic compound having a visible lambda max of greater than 525 or 550 nanometers, e.g., from 525 or 550 to 700 nanometers.

Non-limiting examples of photochromic compounds that can be used in the photochromic coating include benzopyrans, chromenes, e.g., naphthopyrans, such as, naphtho[1,2-b]pyrans, and naphtho[2,1-b]pyrans, spiro-9-fluoreno[1,2-b]pyrans, phenanthropyrans, quinopyrans, and indeno-fused naphthopyrans, such as those disclosed in U.S. Pat. No. 5,645,767 at column 1, line 10 to column 12, line 57, and U.S. Pat. No. 5,658,501 at column 1, line 64 to column 13, line 36 Additional non-limiting examples of photochromic compounds that can be used include the oxazines, such as benzoxazines, naphthoxazines, and spiro(indoline)pyridobenzoxazines. Other photochromic substances contemplated for use herein are photochromic metal dithizonates, e.g., mercury dithizonates, which are described in, for example, U.S. Pat. No. 3,361,706; fulgides and fulgimides, e.g. the 3-furyl and 3-thienyl fulgides and fulgimides, which are described in U.S. Pat. No. 4,931,220 at column 20, line 5 through column 21, line 38; diarylethenes, which are described in U.S. Patent Application 2003/0174560 from paragraph [0025] to [0086]; and mixtures of any of the aforementioned photochromic materials/compounds.

Further non-limiting examples of photochromic compounds, polymerizable photochromic compounds and complementary photochromic compounds are described in the following U.S. patents:
 U.S. Pat. No. 5,166,345 at column 3, line 36 to column 14, line 3;
 U.S. Pat. No. 5,236,958 at column 1, line 45 to column 6, line 65;
 U.S. Pat. No. 5,252,742 at column 1, line 45 to column 6, line 65;
 U.S. Pat. No. 5,359,085 at column 5, line 25 to column 19, line 55;
 U.S. Pat. No. 5,488,119 at column 1, line 29 to column 7, line 65;
 U.S. Pat. No. 5,821,287 at column 3, line 5 to column 11, line 39;
 U.S. Pat. No. 6,113,814 at column 2, line 23 to column 23, line 29;
 U.S. Pat. No. 6,153,126 at column 2, line 18 to column 8, line 60;
 U.S. Pat. No. 6,296,785 at column 2 line 47 to column 31, line 5;
 U.S. Pat. No. 6,348,604 at column 3, line 26 to column 17, line 15; and
 U.S. Pat. No. 6,353,102 at column 1, line 62 to column 11, line 64.

Spiro(indoline)pyrans are also described in the text, *Techniques in Chemistry*, Volume III, "Photochromism", Chapter 3, Glenn H. Brown, Editor, John Wiley and Sons, Inc., New York, 1971. In addition, it is contemplated that organic photochromic materials such as photochromic pigments and photochromic compounds encapsulated in metal oxides can be used in the photochromic coating. See, for example, the materials described in U.S. Pat. Nos. 4,166,043 and 4,367,170.

The photochromic coating of the present invention can contain one photochromic compound or a mixture of two or more photochromic compounds, as desired. Mixtures of photochromic compounds can be used to attain certain activated colors such as a near neutral gray or near neutral brown. See, for example, U.S. Pat. No. 5,645,767, column 12, line 66 to column 13, line 19, which describes the parameters that define neutral gray and brown colors.

The photochromic compound(s) described herein can be incorporated into the curable coating composition by addition to the coating composition and/or by dissolving the compound(s) in a solvent before being added to the curable coating composition. Alternatively, although more involved, the photochromic compound(s) can be incorporated into the cured polymer coating by imbibition, permeation, diffusion or other transfer methods, which methods are known to those skilled in the art of dye transfer into host materials.

In addition to photochromic materials, the photochromic coating (or precursor formulation) can contain additional conventional adjuvants that impart desired properties or characteristics to the coating, or which are required by the process used to apply and cure the photochromic coating on the surface of the plastic substrate, or which enhance the performance of the coating. Such adjuvants include, but are not limited to, ultraviolet light absorbers, light stabilizers, such as hindered amine light stabilizers (HALS), asymmetric diaryloxalamide (oxanilide) compounds and singlet oxygen quenchers, e.g., a nickel ion complex with an organic ligand, antioxidants, polyphenolic antioxidants, heat stabilizers, rheology control agents, leveling agents, e.g., surfactants, free radical scavengers and adhesion promoting agents, such as trialkoxy silanes, e.g., silanes having an alkoxy radical of 1 to 4 carbon atoms, including γ-glycidoxypropyl trimethoxy silane, γ-aminopropyl trimethoxysilane, 3,4-epoxy cyclohexylethyl trimethoxysilane, dimethyldiethoxysilane, aminoethyl trimethoxysilane, and 3-(trimethoxysilyl)propyl methacrylate. Mixtures of such photochromic performance enhancing adjuvant materials are also contemplated. See, for example, the materials described in U.S. Pat. Nos. 4,720,356, 5,391,327 and 5,770,115.

Compatible (chemically and color-wise) tints, e.g., dyes, can also be added to the photochromic coating formulation or applied to the plastic substrate for medical reasons or for reasons of fashion, e.g., to achieve a more aesthetic result. The particular dye selected can vary and will depend on the aforesaid need and result to be achieved. In one embodiment, the dye can be selected to complement the color resulting from the activated photochromic materials used, e.g., to achieve a more neutral color or absorb a particular wavelength or incident light. In another contemplated embodiment, the dye can be selected to provide a desired hue to the substrate and/or coating when the photochromic coating is in an unactivated state.

The photochromic coating composition can be applied to the surface of the plastic substrate as a polymerizable formulation and then cured (polymerized) by methods well known to those skilled in the art including, but not limited to, photopolymerization, thermal polymerization, (including infrared polymerization), and other sources of radiation. Such application methods include the art-recognized methods of spin coating, curtain coating, dip coating, spray coating or by methods used in preparing overlays. Such methods are described in U.S. Pat. No. 4,873,029.

When applied as a polymerizable formulation, the photochromic coating formulation will also typically contain a catalyst or polymerization initiator. The amount of catalyst/polymerization initiator(s) used to polymerize the polymerizable components of the photochromic coating formulation can vary and will depend on the particular initiator and the polymerizable monomers used. Typically, only that amount that is required to initiate (catalyze) and sustain the polymerization reaction is required, i.e., an initiating or catalytic amount. Generally, from 0 to 10 weight percent, e.g., from 0.01 to 8 weight percent, more typically from 0.1 to 5 weight percent, based on the total weight of the polymerizable monomer(s) in the formulation, of at least one catalyst and/or polymerization initiator, including photoinitiators is used. The amount of catalyst/initiator can range between any combinations of the aforestated values, inclusive of the recited values. The catalyst(s)/initiator(s) will be selected from those materials that can be used to polymerize the particular monomer(s) used to produce the polymeric coating chosen as the photochromic host, and that will not impair significantly the function of the photochromic materials that are included in the coating formulation.

For example, catalysts that can be used to cure polyurethane reaction mixtures can be selected from the group consisting of Lewis bases, Lewis acids and insertion catalysts described in Ullmann's Encyclopedia of Industrial Chemistry, $5^{th}$ Edition, 1992, Volume A21, pp. 673 to 674. Usually the catalyst is an organo tin catalyst, e.g., tin octylate, dibutyl tin dilaurate, dibutyl tin diacetate, dibutyl tin mercaptide, dibutyl tin dimaleate, dimethyl tin diacetate, dimethyl tin dilaurate and 1,4-diazabicyclo[2.2.2]octane. Mixtures of tin catalysts can be used. Other tin catalysts described in the art may be used as well.

Epoxy resin coating compositions typically contain a polyacid curing agent having a high average acid functionality, i.e., two or more acid groups per molecule. Typically, the acid group is a carboxylic acid group. Non-limiting examples of polycarboxylic acids include dicarboxylic acids such as oxalic, malonic, succinic, tartaric, glutaric, adipic, sebacic, maleic, fumaric, phthalic, isophthalic, terephthalic, and dodecanedioc acids; tricarboxylic acids such as citric acid; and tetracarboxylic acids such as 1,2,3,4-butane tetracarboxylic acid.

Polyanhydride coating compositions typically contain an amine compound as the curing catalyst. Non-limiting examples of amine compounds include dimethyl cocoamine, dimethyl dodecylamine, triethylamine, triethanolamine and phenolic compounds containing at least two dialklyamino groups. Aminoplast resin and alkoxyacrylamide polymer coating compositions commonly contain an acidic material as a catalyst. Non-limiting examples include phosphoric acid or substituted phosphoric acids, such as alkyl acid phosphate and phenyl acid phosphate; and sulfonic acids or substituted sulfonic acids, such as para-toluene sulfonic acid, dodecylbenzene sulfonic acid and dinonylnaphthalene sulfonic acid.

Acrylic/methacrylic monomer-based coating compositions can contain thermal initiators, e.g., initiators that produce free radicals, such as organic peroxy compounds or azobis(organonitrile) compounds, photoinitiators or mixtures of such initiators.

Non-limiting examples of suitable organic peroxy compounds include peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropyl peroxydicarbonate; diacyl peroxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters, such as t-butylperoxy pivalate, t-butylperoxy octylate, and t-butylperoxy isobutyrate; methylethylketone peroxide; and acetylcyclohexane sulfonyl peroxide.

Non-limiting examples of suitable azobis(organonitrile) compounds include azobis(isobutyronitrile), 2,2'-azobis(2,4-dimethylpentanenitrile), 1,1'-azobiscyclohexanecarbonitrile, and azobis(2,4-dimethylvaleronitrile) and mixtures of such azo thermal initiators. Desired thermal initiators are those that do not discolor the resulting coating or decompose the photochromic material incorporated within the polymerizable coating composition.

Photopolymerization can be performed in the presence of at least one photoinitiator using ultraviolet light and/or visible light, if photoinitiators are required. Photoinitiators, which are free radical initiators, are classified in two major groups based upon their mode of action. Cleavage-type photoinitiators include, but are not limited to, acetophenones, α-aminoalkylphenones, benzoin ethers, benzoyl oximes, acylphosphine oxides and bisacylphosphine oxides. Abstraction-type photoinitiators include, but are not limited to, benzophenone, Michler's ketone, thioxanthone, anthraquinone, camphorquinone, fluorone and ketocoumarin. Abstraction-type photoinitiators function better in the presence of materials such as amines and other hydrogen donor materials added to provide labile hydrogen atoms for abstraction. Typical hydrogen donors have an active hydrogen positioned alpha to an oxygen or nitrogen, e.g., alcohols, ethers and tertiary amines, or an active hydrogen atom directly attached to sulfur, e.g., thiols. In the absence of such added materials, photoinitiation may still occur via hydrogen abstraction from monomers, oligomers or other components of the system.

Non-limiting examples of photopolymerization initiators that can be used include benzil, benzoin, benzoin methyl ether, benzoin isobutyl ether, benzophenol, acetophenone, benzophenone, 4,4'-dichlorobenzophenone, 4,4'-bis(N,N'-dimethylamino)benzophenone, diethoxyacetophenone, fluorones, e.g., the H-Nu series of initiators available from Spectra Group Limited, 2-hydroxy-2-methyl-1-phenylpropan-1-one, 1-hydroxycyclohexyl phenyl ketone, 2-isopropylthixantone, α-aminoalkylphenone, e.g., 2-benzyl-2-dimethylamino-1-(4-morpholinophenyl)-1-butanone, acylphosphine oxides, such as 2,6-dimethylbenzoyl diphenyl phosphine oxide, 2,4,6-trimethylbenzoyl diphenyl phosphine oxide, 2,6-dichlorobenzoyl diphenyl phosphine oxide, and 2,6-dimethoxybenzoyl diphenyl phosphine oxide, bisacylphosphine oxides, such as bis(2,6-dimethyoxybenzoyl)-2,4,4-trimethylpentyl phosphine oxide, bis(2,6-dimethylbenzoyl)-2,4,4-trimethylpentyl phosphine oxide, bis (2,4,6-trimethylbenzoyl)-2,4,4-trimethylpentyl phosphine oxide, and bis(2,6-dichlorobenzoyl)-2,4,4-trimethylpentyl phosphine oxide, phenyl-4-octyloxyphenyliodonium hexafluoroantimonate, dodecyldiphenyliodonium hexafluoroantimonate, (4-(2-tetradecanol)oxyphenyl)-iodonium hexafluoroantimonate and mixtures of such photopolymerization initiators.

The source of radiation used for photopolymerization is selected from those sources that emit ultraviolet light and/or visible light. The source of radiation can be a mercury lamp, a mercury lamp doped with $FeI_3$ and/or $GaI_3$, a germicidal lamp, a xenon lamp, a tungsten lamp, a metal halide lamp or a combination of such lamps. Typically, the absorbance spectra of the photoinitiator(s) is matched with the spectral output of the light source bulb, e.g., an H bulb, D bulb, Q bulb and/or V bulb, for highest curing efficiency. The exposure time of the curable coating to the light source will vary depending upon the wavelength and intensity of the light source, the photoinitiator, and thickness of the coating. Generally, the exposure time will be sufficient to substantially cure the coating, or produce a coating that is cured sufficiently to allow physical handling followed by a post thermal cure. The photochromic coating can also be cured using an electron beam process that does not require the presence of a thermal or photoinitiator.

Solvents can also be present in the coating formulation in order to dissolve and/or disperse the components of the coating formulation. Typically, a solvating amount of solvent is used e.g., an amount which is sufficient to solubilize/disperse the solid components in the coating formulation. Commonly, from 10 to 80 weight percent of solvent material, based on the total weight of the coating formulation, is used.

Solvents include, but are not limited to, benzene, toluene, methyl ethyl ketone, methyl isobutyl ketone, acetone, ethanol, tetrahydrofurfuryl alcohol, propyl alcohol, propylene carbonate, N-methylpyrrolidinone, N-vinyl pyrrolidinone, N-acetyl pyrrolidinone, N-hydroxymethyl pyrrolidinone, N-butyl pyrrolidinone, N-ethyl pyrrolidinone, N-(N-octyl) pyrrolidinone, N-(N-dodecyl)pyrrolidinone, 2-methoxyethyl ether, xylene, cyclohexane, 3-methyl cyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl formamide, ethylene glycol, mono- and di-alkyl ethers of ethylene glycol and their derivatives, which are sold as CELLOSOLVE industrial solvents, and mixtures of such solvents.

In a further contemplated embodiment, the photochromic polymeric coating can be applied as a water-borne coating, e.g., as an aqueous polymer dispersion, such, as a latex, with or without the presence of an organic solvent. This type of system is a two-phase system comprising an aqueous phase and an organic phase, which is dispersed in the aqueous phase. Use of water-borne coatings is well known in the art. See, for example, U.S. Pat. No. 5,728,769, which relates to aqueous urethane resins and coatings prepared from such resins, and the patents referred to in the '769 patent.

After the photochromic coating formulation is applied to the surface of the plastic substrate, it is cured (polymerized) by exposure to ultraviolet or electron beam radiation, or is thermally cured. The specific cure conditions used will depend on the plastic substrate, the polymerizable components in the formulation and the type of catalyst/initiator used, or in the case of electron beam radiation, the intensity of the electron beam. Thermal curing can involve heating from room temperature up to temperatures below which the plastic substrate is not damaged due to such heating. Temperatures up to 200° C. have been reported. Such cure conditions are well known in the art. For example, a typical thermal cure cycle involves heating the formulation from room temperature (22° C.) to from 85 to 125° C. over a period of from 2 to 20 minutes. The time required for ultraviolet or electron beam radiation cures is generally shorter than a thermal cure, e.g., from 5 seconds to 5 minutes, and will depend on the intensity (power) of the radiation. When the thermal or UV/electron beam cure conditions produce a coating that can be physically handled but is not completely cured, an additional thermal post cure step can also be employed to fully cure the photochromic coating.

Prior to applying the photochromic coating to the surface of the plastic substrate, the surface of the substrate is often cleaned and treated to provide a clean surface and a surface that will enhance adhesion of the photochromic coating to the substrate. Effective cleaning and treatments commonly used include, but are not limited to, ultrasonic washing with an aqueous soap/detergent solution, cleaning with an aqueous mixture of organic solvent, e.g., a 50:50 mixture of isopropanol:water or ethanol:water, UV treatment, activated gas treatment, e.g., treatment with low temperature plasma or corona discharge as described earlier, and chemical treatment that results in hydroxylation of the substrate surface, e.g., etching of the surface with an aqueous solution of alkali metal hydroxide, e.g., sodium or potassium hydroxide, which solution may also contain a fluorosurfactant. Generally, the alkali metal hydroxide solution is a dilute aqueous solution, e.g., from 5 to 40 weight percent, more typically from 10 to 15 weight percent, such as 12 weight percent, alkali metal hydroxide. See, for example, U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials.

In some cases, a primer coating is applied to the plastic surface substrate before application of the photochromic coating. The primer coating is interposed between the organic substrate and the photochromic polymeric coating, and serves as a barrier coating to prevent interaction of the components comprising the photochromic polymeric coating with the substrate and vice versa, and/or as an adhesive layer to promote adhesion of the photochromic coating to the plastic substrate. The primer can be applied to the plastic substrate by any of the methods used to apply the photochromic coating, e.g., spray, spin, spread, curtain, roll or dip coating; and can be applied to a cleaned and untreated or cleaned and treated, e.g., chemically treated, surface of the substrate. Primer coatings are well known to those skilled in the art. Selection of an appropriate primer coating will depend on the plastic substrate used and the particular photochromic coating, e.g., the primer coating must be chemically and physically compatible with the surface of the plastic substrate and the photochromic coating, while providing the functional benefits desired for the primer coating, e.g., barrier and adhesive properties.

The primer coating can be one or several monomolecular layers thick, and can range from 0.1 to 10 microns, more usually from 0.1 to 2 or 3 microns in thickness. The thickness of the primer can vary between any combination of the aforementioned values, inclusive of the recited values. One contemplated embodiment of a suitable primer coating comprises an organofunctional silane, such as methacryloxypropyl trimethoxysilane, a catalyst of a material that generates acid on exposure to actinic radiation, e.g., onium salts, and an organic solvent, such as diglyme or isopropyl alcohol, as described in U.S. Pat. No. 6,150,430. A further example of a primer coating is described in U.S. Pat. No. 6,025,026, which describes a composition that is substantially free of organosiloxanes and which comprises organic anhydrides having at least one ethylenic linkage and an isocyanate-containing material.

In a further contemplated embodiment, an abrasion-resistant coating is superposed, e.g., superimposed, on the maleimide derivative-containing layer/film. In such an embodiment, the post thermal cure of the maleimide derivative-containing film can be postponed until after application of the abrasion-resistant coating if there is no significant physical handling of the maleimide derivative-containing film coated product until after application of the abrasion-resistant coating. If such extensive handling is required, it is suggested that the thermal post cure of the maleimide derivative-containing film be performed prior to application of the abrasion-resistant coating.

The cured maleimide derivative-containing film should be transparent, more particularly, optically clear when used for optical, e.g., ophthalmic, applications, and not significantly impair the optical properties of the photochromic coated substrate. For example, the maleimide derivative-containing film should permit a sufficient quantity of the appropriate UV radiation to pass through it in order to activate the photochromic materials incorporated into the photochromic polymeric coating appended to the substrate. The terms "transparent" and "optically clear" are defined earlier in this disclosure. The surface of the cured maleimide derivative-containing film(s) is desirably harder than the photochromic coating to which it is applied, and is usually softer than the abrasion-resistant coating that is commonly applied to it. As described, the cured maleimide derivative-containing film should adhere well to the photochromic coating and be compatible with abrasion resistant coatings that are prepared with organo-silane(s). Further, it is desirable, but not imperative, that the cured malemide derivative-containing film be resistant to treatment, e.g., removal, with aqueous inorganic caustic solutions, e.g., dilute aqueous sodium or potassium hydroxide solutions, as described subsequently herein.

The radiation cured maleimide derivative-containing film should desirably adhere firmly to the photochromic coating applied to the plastic substrate. Adhesion can be determined by the conventional art recognized crosshatch tape peel adhesion test, and by a boiling water crosshatch tape peel adhesion test, which is a more stringent test. The former is often referred to as the primary (1°) test or dry test; while the later is often referred to as the secondary (2°) or wet test. In the primary test, a cutting tool composed of eleven blades spaced approximately 1 mm apart (tip to tip) and 0.65 mm thick is used to make a first long cut on the sample followed by second and third cuts, which are made at 90 degrees to and across the first cut. The second and third cuts are separated from each other to provide separate crosshatch zones. A piece of Scotch 3M masking tape one inch (2.54 cm) wide and 2 to 2½ inches long (5 to 6.3 cm) is applied in the direction of the first cut and pressed down to smooth out any bubbles. The tape is then peeled off the surface with a sharp, rapid, even and continuous movement. The procedure is repeated with a fresh piece of tape. A small piece of tape (1½ inches, 3.8 cm) is applied to each of the crosshatch zones produced by the second and third cuts in a direction 90 degrees to the direction of the first tape, and these pieces of tape also peeled off the surface with a sharp, rapid, even and continuous movement. If 30 percent or less of the squares of the grid produced by the cutting tool are found to have debonded from the substrate (photochromic coating), i.e., at least 70 percent of the grids remain intact, the coating is deemed to pass the adhesion test. More particularly, it is desirable that no more than 20, particularly no more than 10 squares, still more particularly, no more than 5 squares, e.g., 1 square, out of a 100 squares of the grid de-bond from the substrate. In accordance with the present invention, the radiation-cured maleimide derivative-containing film should pass the crosshatch tape peel adhesion test to be considered to have adhered to the photochromic coating. Stated differently, if the radiation-cured maleimide derivative-containing film passes the crosshatch tape peel test, it is referred to herein as being coherently appended (or cohesively appended) or attached to the layer, e.g., the photochromic coating, to which it is appended.

A further more severe adhesion test is the secondary or wet adhesion test, which optionally can be performed to assess the adhesion of the radiation-cured maleimide derivative-containing film to the photochromic coating. This further test, namely, the boiling water cross-hatch adhesion test, involves placing the test sample, e.g., lens, which has been scored with cross hatches, as described above, in boiling deionized water for 30 minutes. After the test sample has cooled to room temperature, the crosshatch tape peel adhesion test, as described above, is performed again. The same pass/fail requirements that were described for the crosshatch adhesion test are used for this boiling water modification of the test.

The radiation-cured maleimide derivative-containing film is, in one contemplated embodiment, resistant to treatment, e.g., removal, by aqueous inorganic caustic solutions, e.g., relatively dilute alkali metal hydroxide solutions, such as solutions of sodium hydroxide or potassium hydroxide. The film is considered to be resistant to removal by such solutions if the thickness of the film is reduced not more than 0.5 micron after exposure to 12.5% aqueous potassium hydroxide at 140° F. (60° C.) for four minutes. Desirably, the film thickness is not reduced more than 0.5 microns after two exposures, more desirably after three exposures, to the aqueous potassium hydroxide solution.

The radiation-cured maleimide derivative-containing film should desirably also be compatible with abrasion-resistant coatings (hard coat), particularly abrasion-resistant coatings comprising organo silane material(s), that are used to protect plastic surfaces from abrasion, scratches, etc. Organo silane-containing abrasion-resistant coatings, often referred to as hard coats or silane-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and U.S. Pat. No. 5,462,806 at column 1, lines 58 through column 2, line 8, and column 3, line 52 through column 5, line 50, which disclosures describe organo silane hard coatings. Reference is also made to U.S. Pat. Nos. 4,731,264, 5,134,191, 5,231,156 and International Patent Publication WO 94/20581 for disclosures of organo silane hard coatings.

While a described physical feature of the radiation-cured maleimide derivative-containing film is that it be compatible with organo silane hard coatings, other coatings that provide abrasion and scratch resistance, such as polyfunctional acrylic hard coatings, melamine-based hard coatings, urethane-based hard coatings, alkyd-based coatings, silica sol-based hard coatings or other organic or inorganic/organic hybrid hard coatings can be used as the abrasion-resistant coating. One skilled in the art can readily determine if the maleimide derivative-containing film is compatible with organo silane hard coats by applying an organo silane hard coat to such a film and determining the compatibility of the maleimide derivative-containing film to that hard coat by means of the cross-hatch tape peel adhesion test, which is performed on the hard coat.

Another method of determining compatibility of the maleimide derivative-containing film to the hard coat is the absence of crazing in the hard coat after it has been applied to the maleimide derivative-containing film and cured. By crazing is meant the presence of fractures in the hard coat. Such fractures are sometimes readily apparent by observation; however, the fractures can be very fine and observable by magnification under bright light. The light source can consist of a high intensity white arc light of a 75 watt Xenon bulb, with the light being projected vertically down through the hard coat.

By use of the term "compatible with an organo silane abrasion resistant coating (hard coat)" is meant that the maleimide derivative-containing film is capable of having an organo silane hard coat deposited on its surface and that the organo silane hard coat adheres to the maleimide derivative-containing film under ordinary handling/wear conditions, as determined by the crosshatch tape peel adhesion test or the absence of crazing in the hard coat. Naturally, the organo silane hard coat can be removed by treatment with concentrated aqueous caustic, or severe mechanical abrasion. Further, the term abrasion-resistant organo silane-containing coating (or other such similar meaning terms) is meant that the abrasion-resistant coating is prepared from a composition comprising at least one organo silane.

It is contemplated that, if required, a primer coating can be applied to the maleimide derivative-containing film before applying the abrasion-resistant coating on top of it. Such primer coatings are known in the art. Selection of an appropriate primer coating will depend on the particular maleimide derivative-containing film and abrasion-resistant coating used, i.e., the primer coating must be chemically and physically compatible (non-reactive) with the surfaces that it abuts. The primer coating can be one or several monomolecular layers thick, and can range from 0.1 to 10 microns, e.g., from 0.1 to 2 or 3 microns, in thickness. Such primer coatings are discussed herein in relation to the photochromic coating, and that discussion is applicable here also.

In one embodiment, the hard coat can be prepared from a composition comprising from 35 to 95 weight percent, as calculated solids, of at least one organo silane monomer represented by the following empirical formula XI:

$$R^1SiW_3 \qquad \qquad XI$$

wherein $R^1$ is glycidoxy($C_1$-$C_{20}$)alkyl, desirably glycidoxy ($C_1$-$C_{10}$)alkyl, and more desirably, glycidoxy ($C_1$-$C_4$)alkyl; W is hydrogen, halogen, hydroxy, $C_1$-$C_5$ alkoxy, $C_1$-$C_5$ alkoxy($C_1$-$C_5$)alkoxy, $C_1$-$C_4$ acyloxy, phenoxy, $C_1$-$C_3$ alkylphenoxy, or $C_1$-$C_3$ alkoxyphenoxy, said halogen being bromo, chloro or fluoro. Typically, W is hydrogen, halogen, hydroxy, $C_1$-$C_3$ alkoxy, $C_1$-$C_3$ alkoxy($C_1$-$C_3$)alkoxy, $C_1$-$C_2$ acyloxy, phenoxy, $C_1$-$C_2$ alkylphenoxy, or $C_1$-$C_2$ alkoxyphenoxy, and the halogen is chloro or fluoro. More typically, W is hydroxy, $C_1$-$C_3$ alkoxy, $C_1$-$C_3$ alkoxy($C_1$-$C_3$)alkoxy, $C_1$-$C_2$ acyloxy, phenoxy, $C_1$-$C_2$ alkylphenoxy, or $C_1$-$C_2$ alkoxyphenoxy.

The weight percent, as calculated solids, of silane monomer(s) represented by empirical formula XI in the hard coat composition is typically from 40 to 90, more typically from 45 to 85, and still more typically from 50 to 70 weight percent. The weight percent calculated solids are determined as the percent of the silanol that theoretically forms during hydrolysis of the orthosilicate.

Non-limiting examples of silane monomers represented by general formula XI include:
glycidoxymethyltriethoxysilane,
glycidoxymethyltrimethoxysilane,
alpha-glycidoxyethyltrimethoxysilane,
alpha-glycidoxyethyltriethoxysilane,
alpha-glycidoxypropyltrimethoxysilane,
alpha-glycidoxypropyltriethoxysilane,
alpha-glycidoxypropyltrimethoxysilane,
alpha-glycidoxypropyltriethoxysilane,
beta-glycidoxyethyltrimethoxysilane,
beta-glycidoxyethyltriethoxysilane,
beta-glycidoxypropyltrimethoxysi lane,
beta-glycidoxypropyltriethoxysilane,
beta-glycidoxybutyltrimethoxysilane,
beta-glycidoxybutyltriethoxysilane, gamma-glycidoxypropyltrimethoxysilane, gamma-glycidoxypropyltriethoxysilane, gamma-glycidoxypropyltripropoxysilane, gamma-glycidoxypropyltributoxysilane, gamma-glycidoxypropyltrimethoxysilane, gamma-glycidoxypropyltriphenoxysilane, gamma-glycidoxybutyltrimethoxysilane, gamma-glycidoxybutyltriethoxysilane, delta-glycidoxybutyltrimethoxysilane, delta-glycidoxybutyltriethoxysilane, hydrolyzates of such silane monomers, and mixtures of such silane monomers and hydrolyzates thereof.

The hard coat composition of the foregoing described embodiments can further include from 5 to 65 weight percent, as calculated solids, of: (a) silane monomers represented by empirical formula XII; (b) metal alkoxides represented by empirical formula XIII; or (c) a mixture thereof in a weight ratio of (a):(b) of from 1:100 to 100:1. Typically, the hard coat composition includes from 10 to 60 weight percent calculated solids, more typically from 15 to 55, and still more typically from 30 to 50 weight percent calculated solids of the aforementioned materials (a), (b) or (c).

The hard coat composition can include at least one silane monomer represented by the following empirical formula XII:

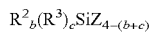  XII wherein $R^2$ can be $C_1$-$C_{20}$ alkyl, $C_1$-$C_{20}$ haloalkyl, $C_2$-$C_{20}$ alkenyl, $C_2$-$C_{20}$ haloalkenyl, phenyl, phenyl($C_1$-$C_{20}$)alkyl, $C_1$-$C_{20}$ alkylphenyl, phenyl($C_2$-$C_{20}$)alkenyl, $C_2$-$C_{20}$ alkenylphenyl, morpholino, amino($C_1$-$C_{20}$)alkyl, amino($C_2$-$C_{20}$)alkenyl, mercapto($C_1$-$C_{20}$)alkyl, mercapto($C_2$-$C_{20}$)alkenyl, cyano($C_1$-$C_{20}$)alkyl, cyano($C_2$-$C_{20}$)alkenyl, acryloxy, methacryloxy, or halogen. The halo or halogen can be bromo, chloro, or fluoro. Typically, $R^2$ is a $C_1$-$C_{10}$ alkyl, $C_1$-$C_{10}$ haloalkyl, $C_2$-$C_{10}$ alkenyl, phenyl, phenyl($C_1$-$C_{10}$)alkyl, $C_1$-$C_{10}$ alkylphenyl, morpholino, amino($C_1$-$C_{10}$) alkyl, amino($C_2$-$C_{10}$) alkenyl, mercapto($C_1$-$C_{10}$)alkyl, mercapto ($C_2$-$C_{10}$) alkenyl, cyano($C_1$-$C_{10}$) alkyl, cyano($C_2$-$C_{10}$)alkenyl, or halogen and the halo or halogen is chloro or fluoro.

In formula XII, $R^3$ can be $C_1$-$C_{20}$ alkylene, $C_2$-$C_{20}$ alkenylene, phenylene, $C_1$-$C_{20}$ alkylenephenylene, amino($C_1$-$C_{20}$)alkylene, amino($C_2$-$C_{20}$)alkenylene; Z can be hydrogen, halogen, hydroxy, $C_1$-$C_5$ alkoxy, $C_1$-$C_5$ alkoxy($C_1$-$C_5$) alkoxy, $C_1$-$C_4$ acyloxy, phenoxy, $C_1$-$C_3$ alkylphenoxy, or $C_1$-$C_3$ alkoxyphenoxy, said halo or halogen being bromo, chloro or fluoro; b and c are each an integer of from 0 to 2; and the sum of b and c is an integer of from 0 to 3. Typically, $R^3$ is $C_1$-$C_{10}$ alkylene, $C_2$-$C_{10}$ alkenylene, phenylene, $C_1$-$C_{10}$ alkylenephenylene, amino($C_1$-$C_{10}$)alkylene, amino($C_2$-$C_{10}$) alkenylene, Z is hydrogen, halogen, hydroxy, $C_1$-$C_3$ alkoxy, $C_1$-$C_3$ alkoxy($C_1$-$C_3$)alkoxy, $C_1$-$C_2$ acyloxy, phenoxy, $C_1$-$C_2$ alkylphenoxy, or $C_1$-$C_2$ alkoxyphenoxy, and the halo or halogen is chloro or fluoro.

Non-limiting examples of silane monomers represented by general formula XII include methyltrimethoxysilane, methyl-triethoxysilane, methyltrimethoxyethoxysilane, methyltri-acetoxysilane, methyltripropoxysilane, methyltributoxysilane, ethyltrimethoxysilane, ethyltriethoxysilane, and gamma-methacryloxypropyltrimethoxysilane, gamma-aminopropyltrimethoxysilane, gamma-aminopropyltriethoxysilane, gamma-mercaptopropyltrimethoxysilane, chloromethyltrimethoxysilane, chloromethyltriethoxysilane, dimethyldiethoxysilane, gamma-chloropropylmethyldimethoxysilane, gamma-chloropropylmethyldiethoxysilane, tetramethylorthosilicate, tetraethylorthosilicate, hydrolyzates of such silane monomers, and mixtures of such silane monomers and hydrolyzates thereof.

The hard coat composition can further include at least one compound represented by empirical formula XIII:

  XIII wherein M is a metal chosen from aluminum, antimony, tantalum, titanium or zirconium; T is $C_1$-$C_{10}$ alkoxy and q is an integer equivalent to the valence of M. Usually, M is chosen from aluminum, titanium or zirconium and T is $C_1$-$C_5$ alkoxy, e.g., propoxy.

The hard coat composition can also include from 0 to 20 weight percent, based on the total weight of the composition, of a metal oxide chosen from silicon dioxide (silica), aluminum oxide (alumina), antimony oxide, tin oxide, titanium oxide, zirconium oxide or mixtures of such metal oxides. The metal oxide can be in the form of a sol. As used in the present specification, the term sol means and includes a colloidal dispersion of finely divided solid inorganic metal oxide particles in an aqueous or an organic liquid. The average size of such particles can range from 1 to 200 nanometers, typically from 2 to 100 nanometers, and more typically, from 5 to 50 nanometers.

Such metal oxide sols can be prepared by hydrolyzing a metal salt precursor for a time sufficient to form the desired particle size or such sols may be purchased commercially. Examples of commercially available metal oxide sols that can be used in the hard coat composition include NALCO® colloidal sols (available from NALCO Chemical Co.), REMA-SOL® colloidal sols (available from Remet Corp.) and LUDOX® colloidal sols (available from E. I. du Pont de Nemours Co., Inc.). Stable acidic and alkaline metal oxide sols are commercially available as aqueous dispersions. Usually, the metal oxide is silica or alumina supplied in the form of an acid stabilized colloidal silica, acid stabilized colloidal alumina, e.g., NALCO® 8676, or an acid stabilized alumina coated silica sol, e.g., NALCO® 1056. Metal oxide sols can also be obtained as dispersions in organic liquids, e.g., ethanol, isopropyl alcohol, ethylene glycol and 2 propoxyethanol.

The hard coat composition also contains a catalytic amount of a water-soluble acid catalyst. A catalytic amount is that amount which is sufficient to cause polycondensation of the silane monomer(s). Typically, the catalytic amount of acid catalyst will range from 0.01 to 10 weight percent, based on the total weight of the hard coat composition. The water-soluble acid catalyst can be an organic carboxylic acid or an inorganic acid. Examples of suitable catalysts include acetic acid, formic acid, glutaric acid, maleic acid, nitric acid, sulfuric acid and hydrochloric acid.

Organic solvents present in the hard coat composition can be added or formed in situ by the hydrolysis of the silane monomer(s). Useful organic solvents are those that will dissolve or disperse the solid components of the coating composition. The minimum amount of solvent present in the coating composition is a solvating amount, i.e., an amount that is sufficient to solubilize or disperse the solid components in the coating composition. For example, the amount of solvent present can range from 20 to 90 weight percent based on the total weight of the coating composition and depends, in part, on the amount of silane monomer present in the coating composition. Examples of solvents include, but are not limited to, the following: benzene, toluene, methyl ethyl ketone, methyl isobutyl ketone, acetone, ethanol, tetrahydrofurfuryl alcohol, propyl alcohol, propylene carbonate, N-methylpyrrolidinone, N-vinylpyrrolidinone, N-acetylpyrrolidinone, N-hydroxymethylpyrrolidinone, N-butyl-pyrrolidinone, N-ethylpyrrolidinone, N-(N-octyl)-pyrrolidinone, N-(n-dodecyl)pyrrolidinone, 2-methoxyethyl ether, xylene, cyclohexane, 3-methylcyclohexanone, ethyl acetate, butyl acetate, tetrahydrofuran, methanol, amyl propionate, methyl propionate, diethylene glycol monobutyl ether, dimethyl sulfoxide, dimethyl formamide, ethylene glycol, mono- and dialkyl ethers of ethylene glycol and their derivatives, which are sold under the trade name CELLOSOLVE industrial solvents, propylene glycol methyl ether and propylene glycol methyl ether acetate, which are sold under the trade name DOWANOL® PM and PMA solvents, respectively, and mixtures of such solvents.

A leveling amount of nonionic surfactant(s) can be present as a component in the hard coat composition. A leveling amount is that amount which is sufficient to allow the coating to spread evenly or to level the hard coat composition on the surface of the maleimide derivative-containing film to which it is applied. Typically, the nonionic surfactant is a liquid at the conditions of use and is used in amounts from about 0.05 to about 1.0 weight percent based on the amount of the silane monomer(s). Suitable nonionic surfactants are described in the *Kirk Othmer Encyclopedia of Chemical Technology*, 3rd Edition, Volume 22, pages 360 to 377. Other potential nonionic surfactants include the surfactants described in U.S. Pat. No. 5,580,819, column 7, line 32 to column 8, line 46.

Non-limiting examples of nonionic surfactants that can be used in the hard coat composition include ethoxylated alkyl phenols, such as the IGEPAL® DM surfactants or octylphenoxypolyethoxyethanol, which is sold as TRITON® X-100, an acetylenic diol such as 2,4,7,9-tetramethyl-5-decyne-4,7-diol, which is sold as SURFYNOL® 104, ethoxylated acetylenic diols, such as the SURFYNOL® 400 surfactant series, fluoro-surfactants, such as the FLUORAD® fluorochemical surfactant series, and capped nonionics, such as the benzyl capped octyl phenol ethoxylates, which is sold as TRITON® CF87, the propylene oxide capped alkyl ethoxylates, which are available as the PLURAFAC® RA series of surfactants, octylphenoxyhexadecylethoxy benzyl ether, polyether modified dimethylpolysiloxane copolymer in solvent, which is sold as BYK®-306 additive by Byk Chemie and mixtures of such recited surfactants.

Water is also present in the hard coat composition in an amount sufficient to form hydrolysates of the silane monomer(s). The water present in the optional metal oxide sol can supply the amount of water necessary. If not, additional water can be added to the coating composition to provide the required additional amount necessary to hydrolyze the silane monomer(s).

The abrasion-resistant coating (hard coat) can be applied to the maleimide derivative-containing film using the same application techniques described with respect to the photochromic coating and the maleimide derivative-containing film, e.g., spin coating. The abrasion resistant film can be applied at a thickness of from 0.5 to 10 microns. Prior to applying the hard coat, e.g., the organo silane hard coat, to the maleimide derivative-containing film, the maleimide derivative-containing film can be treated to enhance its receptivity of and adhesion of the hard coat. Such treatments, e.g., plasma treatments, as are described above with respect to pretreatment of the photochromic coating prior to application of the maleimide derivative-containing film can be used.

In a further embodiment of the present invention, additional coatings, such as antireflective coatings, can be applied to the hard coat layer. Examples of antireflective coatings are described in U.S. Pat. No. 6,175,450 and International Patent Publication WO 00/33111.

The present invention is more particularly described in the following examples, which are intended as illustrative only, since numerous modifications and variations therein will be apparent to those skilled in the art. In the examples, percentages are reported as weight percent, unless otherwise specified. Materials, such as monomers, catalysts, initiators, etc., which are identified in one example by a lower case letter in parenthesis and which are used in other examples, are identified in the subsequent examples with the same lower case number.

EXAMPLE 1

In the following example, plano PDQ coated polycarbonate lenses obtained from Gentex Optics were used. The test lenses were treated with an oxygen plasma for 1 minute using a Plasmatech machine at a power setting of 100 Watts while introducing oxygen at a rate of 100 ml/min into the vacuum chamber of the Plasmatech machine. The lenses were then rinsed with deionized water and dried with air. A photochromic polyurethane coating composition was applied to the plasma treated lenses by spin coating and thermally cured. The components and amounts of the polyurethane composition are tabulated in Table 1. The components of the polyurethane composition were mixed for 30 minutes at 60° C., followed by 30 minutes of mixing at ambient temperature prior to being applied to the lenses. The photochromic polyurethane coating was approximately 20 microns thick.

TABLE 1

Formulation

| Component/ | Amount, Grams |
| --- | --- |
| Desmodur PL 3175A (a) | 2.6 |
| Vestanat B 1358A (b) | 7.6 |
| PC 1122 (c) | 8.0 |
| HCS 6234 polyol (d) | 1.9 |
| Tinuvin 144 UV stabilizer (e) | 0.36 |
| A-187 (f) | 0.53 |
| N-methyl pyrrolidinone | 5.6 |
| Photochromic Material (g) | 0.58 |
| L-5340 surfactant (h) | 0.05 |
| Dibutyltin dilaurate | 0.16 |

(a) Methyl ethyl ketoxime blocked hexamethylene diisocyanate (Bayer)
(b) Methyl ethyl ketoxime blocked isophorone diisocyanate trimer (CreaNova, Inc.)
(c) Polyhexane carbonate diol (Stahl)
(d) Polyacrylate polyol (Composition D in Example 1 of U.S. Pat. No. 6,187,444 B1)
(e) Hindered amine light stabilizer (Ciba-Geigy)
(f) γGlycidoxypropyl trimethoxysilane coupling agent (OSi)
(g) A mixture of naphthopyran photochromic materials to give a gray tint.
(h) Surfactant (Niax)

The photochromic polyurethane coating on the test lenses were treated by plasma discharge using the Plasmatech machine using the same conditions used to treat the uncoated plano lenses. A coating solution was prepared by mixing 2.5 grams of bismaleimido acetate of polyetherdiol, a bi-functional maleimide oligomer (MIA 200 from Dainippon Ink & Chemicals), and 7.5 grams of trimethylolpropane triacrylate (SR-351 from Sartomer), and the coating solution was applied to the test lenses by spin coating to give a wet film weight of approximately 0.05 grams (approximately 10 microns thickness). The coatings were cured in a nitrogen atmosphere with UV light from a D bulb.

Subsequently, a lens was plasma treated using the Plasmatech machine using the same conditions used to treat the uncoated piano lenses, and then hard coated with a siloxane-based hard coat (HI-GARD 1035, available from PPG Industries, Inc.). The hard coat thickness was approximately 2 microns. All of the samples were post baked in a convection oven for 3 hours at 100° C. The test lenses were tested for adhesion using the primary and secondary crosshatch tape peel adhesion test, and for hardcoat compatibility by observing the level of crazing after curing of the hard coat. The test lens coated with the maleimide oligomer coating solution but without the hard coat was found to have 0% adhesion in both the primary (dry) and secondary (wet) crosshatch tape peel adhesion tests. The hard coated lens was found to have 95% adhesion (primary crosshatch) and 10% adhesion (secondary crosshatch) respectively. The hard coated lens was observed to have no crazing, which indicates that the hard coat was compatible with the maleimide oligomer-containing coating.

The maleimide oligomer coated test lenses were transparent and had a light transmission of 86%. These test lenses were exposed to UV light and observed to reversibly change color.

EXAMPLE 2

The procedures of Example 1 were followed using piano PDQ polycarbonate lenses obtained from Gentex Optics, except that the coating solution were prepared using 4 grams of the MIA200 bismaleimidoacetate of polyetherdiol, 6.0 grams of trimethylolpropane triacrylate (3EO) (SR-454 from Sartomer) and 0.5 grams of γ-glycidoxypropyl trimethoxysilane (A-187 from OSi).

The test lenses were treated with a plasma discharge, as described in Example 1, and coated with a photochromic polyurethane coating of the type described in Example 1, and the maleimide oligomer-containing coating solution was applied by spin coating to the photochromic polyurethane coating. The maleimide oligomer-containing coating had a wet film weight of about 0.05 grams (about 10 microns thick). The lens was cured by UV radiation in the manner described in Example 1, and then post baked in a convection oven for 3 hours at 100° C. Tests for adhesion were performed, as described in Example 1. The lens was found to have 90% adhesion (primary crosshatch) and 75% adhesion (secondary crosshatch).

EXAMPLE 3

The procedures of Example 2 were repeated except that the coating solution was prepared using 3.0 grams of MIA200 maleimide oligomer, 7.0 grams of SR-454 (trimethylolpropane triacrylate 3EO), and 0.5 grams of A-187 (γ-glycidoxypropyl trimethoxysilane), and some of the lenses were hard coated with a siloxane-based hard coat in the manner described in Example 1. Adhesion testing of the lenses with and without the hard coat showed 100% adhesion (primary) and 0% adhesion (secondary). No crazing of the hard coat after curing was observed, indicating hard coat compatibility with the maleimide oligomer-containing coating.

Although the present invention has been described with reference to specific details of certain embodiments thereof, it is not intended that such details should be regarded as limitations upon the scope of the invention except insofar as they are included in the accompanying claims.

What is claimed is:

1. A photochromic article comprising:
   (a) a rigid substrate,
   (b) a photochromic organic polymeric coating appended to at least a portion of at least one surface of said substrate, said polymeric coating comprising a photochromic amount of at least one photochromic material,
   (c) a transparent layer of a radiation cured composition comprising a maleimide derivative superposed on said photochromic polymeric coating,
   (d) an abrasion-resistant coating superposed on the radiation cured layer comprising the maleimide derivative.

2. The photochromic article of claim 1 wherein the abrasion-resistant coating comprises an organo silane-based coating.

3. The photochromic article of claim 1 further comprising an antireflective coating affixed to the surface of the abrasion-resistant film.

4. A photochromic article comprising:
   (a) a transparent rigid organic polymeric substrate,
   (b) a photochromic organic polymeric coating appended to at least a portion of at least one surface of said transparent rigid organic polymeric substrate, said photochromic polymeric coating comprising a photochromic amount of at least one organic photochromic material,
   (c) a transparent layer of a radiation cured composition comprising a maleimide derivative appended to said photochromic polymeric coating, and
   (d) an abrasion-resistant coating affixed to the surface of the maleimide-derivative-containing film.

5. The photochromic article of claim 4 wherein the abrasion-resistant coating comprises an organo silane-based coating.

6. The photochromic article of claim 4 further comprising an antireflective coating affixed to the surface of the abrasion-resistant film.

7. A photochromic article comprising:
   (a) a transparent rigid organic polymeric substrate chosen from thermoset substrates prepared from polymerizable compositions comprising at least one allyl diglycol carbonate monomer, substrates prepared from thermoplastic polycarbonates, substrates prepared from polyurea urethanes, or substrates prepared from compositions comprising the reaction product of at least one polyfunctional isocyanate and/or isothiocyanate, polythiol, or polyepisulfide monomer, said substrate having a refractive index of from 1.48 to 1.74,
   (b) a transparent photochromic organic polymeric coating appended to at least one surface of said polymeric substrate, said photochromic organic polymeric coating being chosen from photochromic polyurethane-based coatings, photochromic polyacrylic-based or polymethacrylic-based coatings, photochromic aminoplast resin-based coatings, photochromic epoxy resin-based coatings and photochromic polyurea urethane coatings, said photochromic coating comprising a photochromic amount of at least one organic photochromic material chosen from spirooxazines, benzopyrans, naphthopyrans, fulgides, metal dithizonates or mixtures of such photochromic materials, said photochromic polymeric coating having a thickness of from 10 to 50 microns,
   (c) a transparent film of a radiation-cured composition comprising a maleimide derivative coherently appended to said photochromic polymeric coating, wherein the maleimide derivative is represented by the general formula:

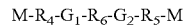

wherein M is the maleimido group; $R_4$ and $R_5$ represent linking groups, which are each independently chosen from bivalent alkylene, alicyclic, arylalkylene or cycloalkyalkylene groups of less than 20 carbon atoms; $G_1$ and $G_2$ each represent an ester linkage represented by —C(O)O— or —OC(O)—, or the group —OC(O)N—, and $R_6$ represents a bivalent linking group chosen from linear or branched alkylene groups of from 1 to 24 carbon atoms, an alkylene group of from 1 to 24 carbon atoms comprising a hydroxy functionality, a cycloalkylene group of from 4 to 7 carbon atoms, a dicycloalkylenealkyl group of from 11 to 24 carbon atoms, an arylene group of from 6 to 10 carbon atoms, an arylalkylene group of from 6 to 24 carbon atoms, a diarylenealkyl group of from 13 to 24 carbon atoms, a polyether group or a polyester group, said polyether and polyester groups having an average molecular weight of from 100 to 5,000, and (d) an abrasion-resistant coating affixed to the surface of the radiation cured film comprising the maleimide derivative.

8. The photochromic article of claim 7 wherein the abrasion-resistant coating comprises an organo silane-based coating.

9. A photochromic article comprising:
(a) a transparent rigid organic polymeric substrate chosen from thermoset substrates prepared from polymerizable compositions comprising at least one allyl diglycol carbonate monomer, substrates prepared from thermoplastic polycarbonates, substrates prepared from polyurea urethanes, or substrates prepared from compositions comprising the reaction product of at least one polyfunctional isocyanate and/or isothiocyanate, polythiol, or polyepisulfide monomer, said substrate having a refractive index of from 1.48 to 1.74,
(b) a transparent photochromic organic polymeric coating appended to at least one surface of said polymeric substrate, said photochromic organic polymeric coating being chosen from photochromic polyurethane-based coatings, photochromic polyacrylic-based or polymethacrylic-based coatings, photochromic aminoplast resin-based coatings, photochromic epoxy resin-based coatings and photochromic polyurea urethane coatings, said photochromic coating comprising a photochromic amount of at least one organic photochromic material chosen from spirooxazines, benzopyrans, naphthopyrans, fulgides, metal dithizonates or mixtures of such photochromic materials, said photochromic polymeric coating having a thickness of from 10 to 50 microns,
(c) a transparent film of a radiation-cured composition comprising a maleimide derivative coherently appended to said photochromic polymeric coating, wherein the maleimide derivative is represented by the general formula:

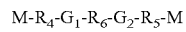

wherein M is the maleimido group; $R_4$ and $R_5$ represent linking groups, which are each independently chosen from bivalent alkylene, alicyclic, arylalkylene or cycloalkyalkylene groups of less than 20 carbon atoms; $G_1$ and $G_2$ each represent an ester linkage represented by —C(O)O— or —OC(O)—, or the group —OC(O)N—, and $R_6$ represents a bivalent linking group chosen from linear or branched alkylene groups of from 1 to 24 carbon atoms, an alkylene group of from 1 to 24 carbon atoms comprising a hydroxy functionality, a cycloalkylene group of from 4 to 7 carbon atoms, a dicycloalkylenealkyl group of from 11 to 24 carbon atoms, an arylene group of from 6 to 10 carbon atoms, an arylalkylene group of from 6 to 24 carbon atoms, a diarylenealkyl group of from 13 to 24 carbon atoms, a polyether group or a polyester group, said polyether and polyester groups having an average molecular weight of from 100 to 5,000, and (d) an antireflective coating affixed to the surface of the abrasion-resistant coating.

* * * * *